United States Patent
Takeuchi et al.

(10) Patent No.: US 6,477,202 B1
(45) Date of Patent: Nov. 5, 2002

(54) APPARATUS OF LAYERED PICTURE CODING, APPARATUS OF PICTURE DECODING, METHODS OF PICTURE DECODING, APPARATUS OF RECORDING FOR DIGITAL BROADCASTING SIGNAL, AND APPARATUS OF PICTURE AND AUDIO DECODING

(75) Inventors: Seiichi Takeuchi, Neyagawa; Masakazu Nishino, Kashiwara; Yuji Fujiwara, Nishinomiya; Kazuhiro Wake, Moriguchi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/144,977

(22) Filed: Sep. 1, 1998

(30) Foreign Application Priority Data

| Sep. 3, 1997 | (JP) | 9-238008 |
| Sep. 25, 1997 | (JP) | 9-259613 |
| Oct. 1, 1997 | (JP) | 9-268468 |
| Oct. 27, 1997 | (JP) | 9-294487 |

(51) Int. Cl.$^7$ ............................ H04N 7/12; H04B 1/66
(52) U.S. Cl. ............................................. 375/240.15
(58) Field of Search ........................ 375/240, 240.1, 375/240.9, 240.11, 240.12, 240.13, 240.14, 240.15, 240.17, 240.18, 240.28, 240.26; 348/390.1, 394.1, 396.1, 409.1, 410.1, 415.1, 416.1, 418.1, 426.1; 382/232, 233, 234, 236; H04N 7/12; H04B 1/66

(56) References Cited

U.S. PATENT DOCUMENTS

| 5,475,435 A | * | 12/1995 | Yonemitsu et al. | 375/240.15 |
| 5,742,343 A | * | 4/1998 | Haskell et al. | 348/240.15 |
| 5,973,739 A | * | 10/1999 | Nilson | 375/240.1 |
| 6,088,061 A | * | 7/2000 | Katata et al. | 348/390.1 |
| 6,097,842 A | * | 8/2000 | Suzuki et al. | 382/232 |
| 6,173,013 B1 | * | 1/2001 | Suzuki et al. | 375/240.16 |

OTHER PUBLICATIONS

ISO/IEC 13818–2 (1995) pp. i–247.

* cited by examiner

Primary Examiner—Chris Kelley
Assistant Examiner—Tung Vo
(74) Attorney, Agent, or Firm—Smith, Gambrell & Russell, LLP

(57) ABSTRACT

A video signal layering-encoding system according to the present invention has at least either a frequency distribution unit to judge a frequency distribution in an input video signal or a motion judgment unit to judge the motion of an input video signal. With this, encoding quantity control according to the characteristics of the input video signal can be performed between layers. Also, with selection of encode modes and sharing of a motion vector, the encoded data of a bidirectionally predicted frame can be reduced and the encoding efficiency of a high resolution signal can be increased.

A digitial broadcast decoding system according to the present invention can readily display a plurality of broadcasting programs on different channels onto a small screen within a main screen when digital broadcasts are received, by a decoding method in which processing is easy, structurally simple circuitry, and software.

In a digital broadcasting signal storage according to the present invention, by thinning out DCT coefficients to reduce the quantity of data to be stored or to slow down the storing speed of requisite data and by addition of a video signal decoding section and video signal encoding section for encoding video signals again, the video signal format in a storage medium can be fixed as a single format.

1 Claim, 24 Drawing Sheets

APPARATUS OF LAYERED PICTURE CODING, APPARATUS OF PICTURE DECODING, METHODS OF PICTURE DECODING, APPARATUS OF RECORDING FOR DIGITAL BROADCASTING SIGNAL, AND APPARATUS OF PICTURE AND AUDIO DECODING

BACKGROUND OF THE INVENTION

1. Field of the Invention

The present invention relates to an encoding quantity control method and video signal encoding apparatus for spatial scalability profile which is hierarchical coding in a spatial axis direction standardized (ISO/IEC 13818-2) by the ISO Moving Picture Experts Group (MPEG), or for other hierarchical coding techniques, and also relates to the storing and decoding of video signals compressed by the MPEG standard.

2. Description of the Prior Art

Conventional video signal layering-encoding apparatus is based on the spatial scalability profile which is hierarchical coding in a spatial axis direction standardized (ISO/IEC 13818-2) by the ISO Moving Picture Experts Group (MPEG).

The constitution and operation of the conventional video signal layering-encoding apparatus will hereinafter be described in reference to FIG. 22, which is a block diagram of the conventional video signal layering-encoding apparatus.

As shown in FIG. 22, an input video signal 5000 is converted to a lower resolution video signal than the input video signal 5000 by a resolution converter 5001.

A motion detector 5002 stores the output of the resolution converter 5001 (the encoded frame of the input video signal 5000) in image memory 5003 and also detects the motion of a macroblock unit from the encoded frame and the previously encoded and decoded past reference frame in the image memory 5003. A motion compensator 5004 outputs a differential signal between the video signal of the encoded frame and the reproduced video signal of the reference frame detected by the motion detector 5002 in the unit of a macroblock. A discrete cosine transform (DCT) unit 5005 outputs the output (differential signal) of the motion compensator 5004 as DCT coefficients for each block. A quantizer 5006 quantizes the DCT coefficients by a quantization step (i.e., a divisor employed in quantization) specified by an encoding rate controlled 5007 and then outputs the quantized DCT coefficients. An inverse quantizer 5008 inversely quantizes the DCT coefficients quantized at the quantizer 5006 by the quantized quantization step and then outputs the inversely quantized DCT coefficients. An inverse DCT (IDCT) unit 5009 outputs the output of the inverse quantizer 5008 as inverse DCT coefficients. A motion compensator 5010 generates a reproduced video signal by adding the output of the IDCT unit 5009 and the video signal of the reference frame whose motion was compensated at the motion compensator 5004, and then stores the reproduced video signal in the image memory 5003. A variable-length encoder 5011 variable-length encodes the output of the quantizer 5006 and a predetermined flag and then outputs the variable-length encoded video signal. A buffer 5012 stores the variable-length encoded video signal temporarily and adjusts the output speed of output data thereof. That is, the buffer 5012 outputs a variable-length encoded video signal with low resolution.

The encoding rate controller 5007 determines the quantization step of the encoded frame for each macroblock, based on the output (differential signal) of the motion compensator 5004, the encoded length of the encoded video signal, and the residual quantity information on the buffer 5012.

On the other hand, the resolution converter 5013 resolution converts the output (reproduced video signal) of the motion compensator 5010, i.e., converts the resolution of the reproduced video signal to the same resolution as the input video signal 5000 and then stores it in image memory 5015. A motion detector 5014 stores the encoded frame of the input video signal 5000 in the image memory 5015 and also detects the motion of a macroblock unit from the encoded frame, the previously encoded and decoded past reference frame (high resolution video signal) in the image memory 5015, and from the reference frame that is the video signal of the same time among the low resolution signals which are the outputs of the resolution converter 5013. That is, in this motion detection, the motion detector 5014 compares the encoded frame of the input video signal 5000 with the above-mentioned past reference frame, the above-mentioned reference frame of the same time, and a reference frame generated by a combination of these, and then detects a reference frame with the highest correlation in the unit of a macroblock. The reference frame with the highest correlation is output from the image memory 5015 to the motion compensator 5016.

The motion compensator 5016 outputs a differential signal between the video signal of the encoded frame and the reproduced video signal of the reference frame detected by the motion detector 5014 in the unit of a macroblock. A DCT unit 5017 outputs the output (differential signal) of the motion compensator 5016 as DCT coefficients for each block. A quantizer 5018 quantizes the DCT coefficients by a quantization step specified by an encoding rate controller 5019 and then outputs the quantized DCT coefficients. An inverse quantizer 5020 inversely quantizes the DCT coefficients quantized at the quantizer 5018 by the quantized quantization step and then outputs the inversely quantized DCT coefficients. An IDCT unit 5012 outputs the output of the inverse quantizer 5020 as inverse DCT coefficients. A motion compensator 5022 generates a reproduced video signal by adding the output of the IDCT unit 5021 and the reproduced video signal of the reference frame whose motion was compensated at the motion compensator 5016, and then stores the reproduced video signal in the image memory 5015. A variable-length encoder 5023 variable-length encodes the output of the quantizer 5018 and a predetermined flag and then outputs the variable-length encoded video signal. A buffer 5024 stores the variable-length encoded video signal temporarily and adjusts the output speed of output data thereof. That is, the buffer 5024 outputs a variable-length encoded video signal with high resolution.

The encoding rate controller 5019 determines the quantization step of the encoded frame for each macroblock, based on the outputs (differential signal) of the motion compensator 5016, the encoded length of the encoded video signal, and the residual quantity of the buffer 5024.

In such a conventional video signal layering-encoding system, however, the two encoding rate controllers 5007 and 5019 control the encoding quantities individually and independently so that the mean bit rates of the outputs become constant, respectively. For that reason, in both the cases where the input video signal 5000 contains and does not almost contain a large quantity of high frequency component, the encoding quantities are controlled in the same manner. More specifically, the control for the encoding quantity between layers is not entirely performed according to the input video signal 5000.

In addition, although encoding efficiency has been improved in encoding a high resolution video signal by an increase in the number of reference images for motion vector detection, an improvement in the encoding efficiency by using a low resolution signal more effectively has not been performed.

Next, a conventional digital broadcast decoding apparatus will be described in reference to FIG. 23, which illustrates a block diagram of the conventional digital broadcast decoding apparatus.

The conventional digital broadcast decoding apparatus shown in FIG. 23 is a receiver for a digital broadcast that employs video and audio signals compressed and encoded by the MPEG standard.

As shown in FIG. 23, a demodulating section 6001 performs a predetermined demodulation on a received digital broadcast 6000, thereby generating an MPEG stream. A separating section 6002 separates video and audio signal compressed streams on a predetermined channel from the generated MPEG stream. An audio signal decoding section 6003 decodes the audio signal compressed stream and outputs an audio signal 6020.

In a video signal decoding section 6004, (1) a variable-length decoder 6005 variable-length decodes the aforementioned video signal compressed stream and then outputs the motion vector of a macroblock unit, a quantization step (i.e., a divisor employed in quantization), and DCT coefficients, (2) an inverse quantizer 6006 inversely quantizes the DCT coefficients by the quantization step decoded in the unit of a macroblock, (3) an IDCT unit 6007 outputs the inversely quantized DCT coefficients as IDCT coefficients, (4) a motion compensator 6008 reproduces a video signal from the IDCT coefficients obtained by employing a motion vector in a macroblock unit and also from a signal stored in memory 6004, and (5) a memory controller 6010 controls the storage of the reproduced video signal in the memory 6004, the output of the video signal stored in the memory 6004 to the motion compensator 6008, and the output of the reproduced video signal, thereby outputting a decoded video signal 6021.

Such a conventional digital broadcast decoding system reproduces only a video signal present on one channel and, therefore, has the disadvantage that a broadcasting program on a different channel cannot be monitored on a small screen within a main screen at the same time. To achieve this, the system can be equipped with a plurality of devices of the same structure. But in such a case, there is a disadvantage that the cost is significantly increased.

Next, a conventional digital broadcasting signal storage will be described in reference to FIG. 24, which illustrates a block diagram of the conventional digital broadcasting signal storage.

The conventional digital broadcast storage shown in FIG. 24 is a video tape recorder (e.g., D-VHS) for recording a digital broadcast which employs video and audio signals compressed and encoded by the MPEG standard.

As shown in FIG. 24, a demodulating section 7001 performs a predetermined demodulation on a received digital broadcast, thereby generating an MPEG stream. A separating section 7002 separates a transport stream (TS) on a predetermined channel from the MPEG stream. A storing section 7003 stores the separated TS in a storage medium 7004.

In such a conventional digital broadcasting signal storage, storage media are restrained either by a large quantity of data to be stored or due to the fast storing speed of requisite data. Furthermore, since different video signals in various formats (resolution, frame frequency, etc.) are present in storage media, there is a problem that video signals are difficult to handle.

SUMMARY OF THE INVENTION

It is an object of the present invention to provide a video signal layering-encoding system and a video signal layering-encoding method which are capable of controlling the quantity of encoding between layers in accordance with an input video signal.

Another object of the invention is to provide a digital broadcast decoding system, a digital broadcast decoding method, and a video signal decoding system which are capable of monitoring a plurality of broadcasting programs (including a broadcasting program on a different channel) by simpler constitution than prior art.

Still another object of the invention is to provide a digital broadcasting signal storage and a digital broadcasting signal storing method which are capable of solving, for example, the aforementioned problems that storage media are restrained either by a large quantity of data to be stored or due to the fast storing speed of requisite data and that since different video signals in various formats (resolution, frame frequency, etc.) are present in storage media, video signals are difficult to handle.

The first invention of the present invention is a method of layering and encoding an input video signal on the basis of spatial resolution, comprising:

a first resolution tranformation step of generating a second video signal with low resolution from a first video signal with high resolution which is said input video signal;

a first encoding step of encoding said second video signal;

a decoding step of decoding the encoded second video signal;

a second resolution transformation step of generating a third video signal with the same high resolution as said first video signal, based on the decoded video signal obtained by decoding said second video signal;

a second encoding step of encoding a video signal with the same high resolution as said first video signal, obtained based on said first video signal and said third video signal;

a high frequency component information output step of outputting information on a high frequency component which is included in said first video signal or said second video signal; and an encoding quantity control step of controlling an encoding rate at which said second video signal is encoded by said first encoding step and an encoding rate at which said first video signal is encoded by said second encoding step, based on the output high frequency component information.

The second invention of the present invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

second resolution transformation means to generate a third video signal with the same resolution as said first video signal from the decoded video signal of said second video signal;

second encoding means to encode said first video signal, based on a time axis correlation of the first video signal and based on said third video signal as a predicted video signal;

frequency distribution measuring mean to measure a frequency distribution of said first video signal; and encoding quantity control means to control an encoding rate at which said second video signal is encoded by said first encoding means and an encoding rate at which said first video signal is encoded by said second encoding means, based on the measured frequency distribution.

With this, for example, by having a frequency distribution judgment unit, encoding quantity control according to a frequency component contained in an input video signal can be performed between layers.

The third invention of the present invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

second resolution transformation means to generate a third video signal with the same resolution as said first video signal from the decoded video signal of said second video signal;

differential signal generating means to generate a fourth video signal which is a differential signal between said first video signal and said third video signal;

motion detection means to detect motion from said first video signal;

second encoding means to encode said fourth video signal, based on the detected motion of said firs video signal;

frequency distribution measuring means to measure a frequency distribution of said first video signal; and encoding quantity control mean to control an encoding rate at which said second video signal is encoded by said first encoding means and an encoding rate at which said fourth video signal is encoded by said second encoding means, based on the measured frequency distribution.

With this, for example, by having a frequency distribution judgment unit, encoding quantity control according to a frequency component contained in an input video signal can be performed between layers in the hierarchical coding in which an encoded signal at a high resolution component is a differential signal with a video signal reproduced from a low resolution component.

The fourth invention of the present invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

second resolution transformation means to generate a third video signal with the same resolution as said first video signal from the decoded video signal of said second video signal;

motion detection means to detect motion from said second video signal;

second encoding means to encode said first video signal, based on a time axis correlation of the first video signal and based on said third video signal as a predicted video signal; and encoding quantity control means to control an encoding rate at which said second video signal is encoded by said first encoding means and an encoding rate at which said first video signal is encoded by said second encoding means, based on the detected motion of said second video signal.

The fifth invention of the present invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

second resolution transformation means to generate a third video signal with the same resolution as said first video signal from the decoded video signal of said second video signal;

motion detection means to detect motion from said first video signal;

second encoding means to encode said first video signal, based on a time axis correlation of the first video signal and based on said third video signal as a predicted video signal; and encoding quantity control means to control an encoding rate at which said second video signal is encoded by said first encoding jeans and an encoding rate at which said first video signal is encoded by said second encoding means, based on the detected motion of said first video signal.

With this, for example, by having a motion judgment unit, encoding quantity control according to the motion of an input video signal can be performed between layers.

The sixth invention of the present invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

second resolution transformation means to generate a third video signal with the same resolution as said first video signal from the decoded video signal of said second video signal;

differential signal generating means to generate a fourth video signal which is a differential signal between said first video signal and said third video signal;

motion detection means to detect motion from said first video signal;

second encoding means to encode said fourth video signal, based on the detected motion of said first video signal; and encoding quantity control means to control an encoding rate at which said second video signal is encoded by said first encoding means and an encoding rate at which said fourth video signal is encoded by said second encoding means, based on the detected motion of said first video signal.

With this, for example, by having a motion judgment unit, encoding quantity control according to the motion of an input video signal can be performed between layers in the hierarchical coding in which an encoded signal at a high resolution component is a differential signal with a video signal reproduced from a low resolution component.

The seventh invention of eh present invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

second resolution transformation means to generate a third video signal with the same resolution as said first video signal from the decoded video signal of said second video signal;

motion detection means to detect motion from said second video signal;

second encoding means to encode said first video signal, based on a time axis correlation of the first video signal and based on said third video signal as a predicted video signal;

frequency distribution measuring means to measure a frequency distribution of said first video signal; and encoding quantity control means to control an encoding rate at which said second video signal is encoded by said first encoding means and an encoding rate at which said first video signal is encoded by said second encoding means, based on the detected frequency distribution and the detected motion of said second video signal.

The eighth invention of the present invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

second resolution transformation means to generate a third video signal with the same resolution as said first video signal from the decoded video signal of said second video signal;

motion detection means to detect motion from said first video signal;

second encoding means to encode said first video signal, based on a time axis correlation of the first video signal and based on said third video signal as a predicted video signal;

frequency distribution measuring means to measure a frequency distribution of said first video signal; and encoding quantity control means to control an encoding rate at which said second video signal is encoded by said first encoding means and an encoding rate at which said first video signal is encoded by said second encoding means, based on the detected frequency distribution and the detected motion of said first video signal.

With this, for example, by having a frequency distribution judgment unit, encoding quantity control according to a frequency component contained in an input video signal can be performed between layers, and by having a motion judgment unit, encoding quantity control according to the motion of an input video signal can be performed between layers.

The ninth invention of the present invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

second resolution transformation means to generate a third video signal with the same resolution as said first video signal from the decoded video signal of said second video signal;

differential signal generating means to generate a fourth video signal which is a differential signal between said first video signal and said third video signal;

motion detection means to detect motion from said first video signal;

second encoding means to encode said fourth video signal, based on the detected motion of said first video signal;

frequency distribution measuring means to measure a frequency distribution of said first video signal; and encoding quantity control means to control an encoding rate at which said second video signal is encoded by said first encoding means and an encoding rate at which said fourth video signal is encoded by said second encoding means, based on the measured frequency distribution and the detected motion of said first video signal.

With this, for example, by having a frequency distribution judgment unit, encoding quantity control according to a frequency component contained in an input video signal can be performed between layers in the hierarchical coding in which an encoded signal at a high resolution component is a differential signal with a video signal reproduced from a low resolution component, and by having a motion judgment unit, encoding quantity control according to the motion of an input video signal can be performed between layers in the hierarchical coding in which an encoded signal at a high resolution component is a differential signal with a video signal reproduced from a low resolution component.

The seventeenth invention of the present invention is a method of layering and encoding an input video signal on the basis of spatial resolution, comprising:

a first resolution transformation step of generating a second video signal with low resolution from a first video signal with high resolution which is said input video signal;

a first encoding step of encoding said second video signal;

a decoding step of decoding the encoded second video signal;

a second resolution transformation step of generating a third video signal with the same high resolution as said first video signal, based on the decoded video signal obtained by decoding said second video signal; and a second encoding step of encoding said first video signal, based on a plurality of encode modes;

wherein, when in said second encoding step said encoding is performed by employing an encode mode based on bidirectional prediction in a time axis direction among said plurality of encode modes, only information indicating which of said first video signal or said decoded video signal is utilized by the encoding in said first encoding step or encoding in said second encoding step is encoded.

The eighteenth invention of the prevent invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

second resolution transformation means to generate a third video signal with the same resolution as said first video signal from the decoded video signal of said second video signal; and second encoding means to encode each frame of said first video signal by at least one of the encode modes among (1) spatial inter-resolution predictive coding which employs prediction in a spatial axis direction employing said third video signal, (2) intraframe coding which employs only data within said frame, (3) interframe forward predictive coding which employs forward prediction in a time axis direction, and (4) interframe bidirectional predictive coding which employs bidirectional prediction in the time axis direction;

wherein, when said interframe bidirectional predictive coding is performed by said second encoding means, only a motion vector obtained by interframe bidirectional prediction is encoded.

With this, for example, by encoding only a motion vector based on bidirectional prediction between frames, a reduction in the quantity of encoding becomes possible, so the encoding efficiency of high resolution signals can be enhanced.

The nineteenth invention of eh present invention is an apparatus for layering and encoding a video signal on the basis of spatial resolution, comprising:

first resolution transformation means to generate a second video signal with low resolution from a first video signal with high resolution which is an input video signal;

first encoding means to encode each frame of said second video signal by either (1) intraframe coding which employs only data within said frame, (2) interframe forward predictive coding which employs forward prediction in a time axis direction, or (3) interframe bidirectional predictive coding which employs bidirectional prediction in the time axis direction;

decoding means to decode the encoded second video signal;

second resolution transformation means to generate a third video signal with the same resolution as said first video signal from the decoded video signal of said second video signal; and second encoding means to encode each frame of said first video signal by at least one of the encode modes among (1) spatial inter-resolution predictive coding which employs prediction in a spatial axis direction employing said third video signal, (2) intraframe coding which employs only data within said frame, (3) interframe forward predictive coding which employs forward prediction in a time axis direction, and (4) interframe bidirectional predictive coding which employs bidirectional prediction in the time axis direction;

wherein, when said interframe bidirectional predictive coding is performed by said second encoding mean, only a motion vector obtained by interframe bidirectional prediction is encoded.

With this, for example, in addition to the aforementioned advantages, the encoded type of each frame becomes the same in encoding a low resolution signal and a high resolution signal, so it becomes possible to apply the motion vector of a low resolution signal when a high resolution signal is decoded, and consequently, error tolerance is increased.

The twenty-fifth invention of the present invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

a second resolution transformation means to generate a third video signal with the same resolution as said first video signal from the decoded video signal of said second video signal; and second encoding means to encode each frame of said first video signal by at lest one of the encode modes among (1) spatial inter-resolution predictive coding which employs prediction in a spatial axis direction employing said third video signal, (2) intraframe coding which employs only data within said frame, (3) interframe forward predictive coding which employs forward prediction in a time axis direction, and (4) interframe bidirectional predictive coding which employs bidirectional prediction in the time axis direction;

wherein said second encoding means encodes frames of said first video signal at intervals of a predetermined number of frames by said spatial inter-resolution predictive coding alone.

With this, for example, intraframe coding is not performed on high resolution signals, so a reduction in the quantity of encoding becomes possible, so that the encoding efficiency of high resolution signals can be enhanced.

The twenty-sixth invention of the present invention is an apparatus for layering and encoding a video signal on the basis of spatial resolution, comprising:

first resolution transformation means to generate a second video signal with low resolution from a first video signal with high resolution which is an input video signal;

first encoding means to encode said second video signal;

decoding means to decode the encoded second video signal;

second resolution transformation means to generate a third video signal with the same resolution as said first video signal from the decoded video signal of said second video signal;

second encoding means to encode each frame of said first video signal by at least one of the encode modes among (1) spatial inter-resolution predictive coding which employs prediction in a spatial axis direction employing said third video signal, (2) intraframe coding which employs only data within said frame, (3) interframe forward predictive coding which employs forward prediction in a time axis direction, and (4) interframe bidirectional predictive coding which employs bidirectional prediction in the time axis direction; and motion vector detection means to detect a motion vector between frames of said first video signal;

wherein said second encoding means performs encoding by employing the motion vector detected by said motion vector detection means, and said first encoding means performs encoding by employing a motion vector obtained by multiplying the motion vector detected at said motion vector detection means by a predetermined number.

With this, for example, as the motion vector detection of the frame of a high resolution signal is not performed, overall circuit size can be reduced, and as the motion vector is not encoded, the encoding efficiency of high resolution signals can be enhanced.

The twenty-eight invention of the present invention is a method of layering and encoding an input video signal on the basis of spatial resolution, comprising:

a first resolution transformation step of generating a second video signal with low resolution from a first video signal with high resolution which is said input video signal;

a first encoding step of encoding said second video signal;

a decoding step of decoding the encoded second video signal;

a second resolution transformation step of generating a third video signal with the same high resolution as said first video signal, based on the decoded video signal obtained by decoding said second video signal;

a differential signal generation step of computing a data difference between frames of said first and third video signals which correspond with each other and generating a differential signal;

a band dividing step of dividing the generated differential signal into a plurality of predetermined bands and generating a band dividing signal; and a second encoding step of encoding the generated band dividing signal.

The twenty-ninth of the present invention is an apparatus for layering and encoding an input video signal on the basis of spatial resolution, comprising:

first resolution transformation means to generate a second video signal with low resolution from a first video signal with high resolution which is said input video signal;

first encoding means to encode said second video signal;

decoding mean to decode the encoded second video signal;

second resolution transformation means to generate a third video signal with the same high resolution as said first video signal, based on the decoded video signal obtained by decoding said second video signal;

differential signal generation means to compute a data difference between frames of said first and third video signals which correspond with each other and generate a differential signal;

band dividing means to divide the generated differential signal by said differential signal generation means into a plurality of predetermined bands and generate a band dividing signal; and second encoding means to encode said band dividing signal generated by said band dividing means.

With this, for example, different encoding methods are employed in a low resolution signal and a high resolution signal, so if both signals are combined together, a high resolution signal can be encoded so that it is effective and therefore the picture quality of a high resolution signal can be improved.

The thirtieth invention of the present invention is a digital broadcast decoding method of decoding a broadcasting signal compressed by the Moving Picture Experts Group (MPEG) standard and multiplexed, comprising:

a demodulation step of performing a predetermined demodulation on said broadcasting signal;

a separation step of separating the demodulated broadcasting signal into a video signal compressed stream and an audio signal compressed stream on a first channel;

a first video signal decoding step of decoding the separated video signal compressed stream present on said first channel;

a first audio signal decoding step of decoding the separated audio signal compressed stream present on said first channel; and a second video signal decoding step of decoding a video signal compressed stream present on a second channel different from said first channel;

wherein in said second video signal decoding step, (1) the video signal compressed stream on said second channel is decoded, (2) a motion vector, and a DC component in DCT coefficients are extracted, or a DC component and some of DCT coefficients excluding the DC component are extracted, and (3) based on the extracted contents, said second video signal is decoded.

The thirty-first invention of the present invention is a digital broadcast decoding apparatus for decoding a broadcasting signal which is generated from a video signal and an audio signal which are compressed by the Moving Picture Experts Group (MPEG) standard, multiplexed and modulated, comprising:

a demodulating section to perform a predetermined demodulation on said digital broadcasting signal;

a separating section to separate the demodulated broadcasting signal into a video signal compressed stream and an audio signal compressed stream on at least one channel by releasing said multiplexing;

a first video signal decoding section to decode the separated video signal compressed stream present on a predetermined channel;

an audio signal decoding section to decode the separated audio signal compressed stream present on said predetermined channel;

a second video signal decoding section to decode a video signal compressed stream present on a channel other than said predetermined channel and to output the decoded signal; and a video signal overlaying section to overlay a video signal output of said second video signal decoding section at a predetermined position on a video signal output of said first video signal decoding section and to output the overlaid signal;

wherein said second video signal decoding section has:
a variable-length decoder which (1) variable-length decodes said video signal compressed stream, (2) extracts a motion vector and a DC component, or (3) extracts a quantization step when said DC component is quantized, the quantization step being a divisor employed in the quantization;

inverse differential pulse code modulation (DPCM) unit to perform inverse DPCM only when DPCM has been performed on said DC component;

an inverse quantizer to perform inverse quantization only when said DC component has been quantized;

memory to store the decoded video signal;

a motion compensator to compensate motion by employing both a video signal compensated and decoded after said motion vector has been transformed by a predetermined transformation and a video signal stored in said memory; and a memory controller to control writing of data to said memory and reading of data from said memory.

With this, for example, a broadcasting program on a different channel can be readily displayed on a small screen within a main screen when a digital broadcast is received.

The thirty-third invention of the present invention is a digital broadcast decoding apparatus for decoding a broadcasting siganal which is generated from a video signal and an audio signal which are compressed by the Moving Picture Experts Group (MPEG) standard, multiplexed and modulated, comprising:

a demodulating section to perform a predetermined demodulation on said digital broadcasting signal;

a separating section to separate the demodulated broadcasting signal into a video signal compressed stream and an audio signal compressed stream on at least one channel by releasing said multiplexing;

a first video signal decoding section to decode the separated video signal compressed stream present on a predetermined channel;

an audio signal decoding section to decode the separated audio signal compressed stream present on said predetermined channel;

a second video signal decoding section to decode a video signal compressed stream present on a channel other than said predetermined channel and to output the decoded signal; and a video signal overlaying section to overlay a video signal output of said second video signal decoding section at a predetermined position on a video signal output of said first video signal decoding section and to output the overlaid signal;

wherein said second video signal decoding section has:
a variable-length decoder which (1) variable-length decodes said video signal compressed stream and (2) extracts a motion vector, a quantization step which is a divisor employed in quantization, and M×N DCT coefficients consisting of M coefficients in a horizontal direction (where M is a natural number from 1 to 8) and N coefficients in a vertical direction (where N is a natural number from 1 to 8);

an inverse quantizer to quantize said M×N DCT coefficients inversely;

memory to store the decoded video signal;

a motion compensator to compensate motion by employing both a video signal compensated and decoded after said motion vector has been transformed in horizontal and vertical directions by a predetermined transformation and a video signal stored in said memory; and a memory controller to control writing of data to said memory and reading of data from said memory.

With this, for example, a broadcasting program on a different channel can be readily displayed on a small screen within a main screen when a digital broadcast is received.

The fortieth invention of the present invention is a digital broadcasting signal storing method of receiving and storing a broadcasting signal compressed by the Moving Picture Experts Group (MPEG) standard and multiplexed, comprising the steps of:

receiving said broadcasting signal and performing a predetermined demodulation;

separating a video signal compressed stream from the demodulated broadcasting signal;

decoding the separated video signal compressed stream;

based on a predetermined flag in the decoded stream, and/or based on a predetermined motion vector and predetermined DCT coefficients in the decoded stream, (1) converting various formats in said decoded stream to a predetermined format, and/or (2) reducing the data amount of said decoded stream, and then (3) encoding said decoded stream; and storing the encoded stream in a predetermined storage medium.

The forty-first invention of the present invention is a digital broadcasting signal storage for storing a broadcast compressed by the Moving Picture Experts Group (MPEG) standard, comprising:

a demodulating section to perform a predetermined demodulation on a digital broadcast which is broadcasted by compressing a video signal and an audio signal by the MPEG standard and performing predetermined multiplexing and modulation on the video and audio signals;

a separating section to separate video and audio signal compressed streams on a predetermined channel by releasing said predetermined multiplexing;

memory to store the separated audio signal compressed stream temporarily;

a variable-length decoder to perform variable-length decoding on the separated video signal compressed stream and to select various flags, motion vectors, and a predetermined number of DCT coefficients (M coefficients in a horizontal direction where M is a natural number from 1 to 8 and N coefficients in a vertical direction where N is a natural number from 1 to 8);

a variable-length encoder to perform variable-length encoding on the selected various flags and motion vectors, by performing a predetermined flag transformation on the selected various flags and also performing a motion vector transformation on the selected motion vectors;

a multiplexing section to multiplex the variable-length encoded video signal data and said audio signal compressed stream; and a storage section to store the multiplexed data in a predetermined storage medium.

With this, for example, either by thinning out DCT coefficients to reduce the quantity of data to be stored or to slow down the storing speed of requisite data, or by encoding DCT coefficients again, even in the case where video signals in various formats (resolution, frame frequency, etc.) are input, the video signals can be stored in a storage medium as a signal format.

The forty-second invention of the present invention is a digital broadcasting signal storage for storing a broadcast compressed by the Moving Picture Experts Group (MPEG) standard, comprising:

a demodulating section to perform a predetermined demodulation on a digital broadcast which is broadcasted by compressing a video signal and an audio signal by the MPEG standard and performing predetermined multiplexing and modulation on the video and audio signals;

a separating section to separate video and audio signal compressed streams on a predetermined channel by releasing said predetermined multiplexing;

memory to store the separated audio signal compressed stream temporarily;

a variable-length decoder which variable-length decodes the separated video signal compressed stream and selects various flags, (1) performs a motion vector transformation when a motion vector has been determined in a frame unit, (2) converts the motion vector to a frame unit by a predetermined approximation method when the motion vector has been determined in a field unit, (3) selects only a predetermined number of DCT coefficients (M coefficients in a horizontal direction and N coefficients in a vertical direction where M and N are a natural number from 1 to 8) when DCT coefficients have been determined in a frame unit, and (4) deletes one group of DCT coefficients and selects only a predetermined number of DCT coefficients (M coefficients in a horizontal direction and K coefficients in a vertical direction where M and K are a natural number from 1 to 8) when DCT coefficients have been determined in a field unit;

a variable-length encoder to perform variable-length encoding on the selected various flags, motion vectors, and DCT coefficients by performing a predetermined flag transformation on the selected various flags, motion vectors, and DCT coefficients;

a multiplexing section to multiplex the variable-length encoded video signal data and said audio signal compressed stream; and a storage section to store the multiplexed data in a predetermined storage medium.

With this, for example, either by thinning out DCT coefficients to reduce the quantity of data to be stored or to slow down the storing speed of requisite data, or by encoding DCT coefficients again, even in the case where video signals in various formats (resolution, frame frequency, etc.) are input, the video signals can be stored in a storage medium as a single format.

The forty-third invention of the present invention is an apparatus for reproducing a video signal and an audio signal, comprising:

a reproducing section to reproduce data stored in the digital broadcasting signal storage as set forth in said forty-first or said forty-second invention;

a separating section to separate the reproduced data into video and audio signal compressed streams;

a video signal decoding section to decode the separated video signal compressed stream; and an audio signal decoding section to decode the separated audio signal compressed stream;

wherein the video signal decoding section has:

a variable-length decoder to perform variable-length decoding on said video signal compressed stream;

an inverse quantizer to quantize the variable-length decoded data inversely;

an IDCT unit to perform an inverse M×N or M×K DCT (where M, N, and K are a natural number from 1 to 8) on the inversely quantized data;

memory to store the decoded video signal;

a motion compensator to compensate motion by employing both a video signal decoded with a motion vector and a video signal stored in said memory; and a memory controller to control writing of data to said memory and reading of data from said memory.

With this, for example, by thinning out DCT coefficients, the quantity of data to be stored can be reduced and the speed of requisite data can be slowed down.

The forty-fourth invention of the present invention is a digital broadcasting signal storage for storing a broadcast compressed by the Moving Picture Experts Group (MPEG) standard, comprising:

a demodulating section to perform a predetermined demodulation on a digital broadcast which is broadcasted by compressing a video signal and an audio signal by the MPEG standard and performing predetermined multiplexing and modulation on the video and audio signals;

a separating section to separate video and audio signal compressed streams on a predetermined channel by releasing said predetermined multiplexing;

memory to store the separated audio signal compressed stream temporarily;

a video signal decoding section to decode the separated video signal compressed stream;

a video signal compression section to compress a video signal which is the output of said video signal decoding section;

a multiplexing section to multiplex the video signal compressed stream compressed at said video signal compression section and said audio signal compressed stream; and a storage section to store the multiplexed data in a predetermined storage medium;

wherein said video signal decoding section has:

a variable-length decoder to perform variable-length decoding on said video signal compressed stream;

an inverse quantizer to quantize the variable-length decoded data inversely;

an IDCT unit to perform an inverse DCT on the inversely quantized data;

memory to store the decoded video signal;

a motion compensator to compensate motion by employing both a video signal decoded with a motion vector and a video signal stored in said memory; and a memory controller to control writing of data to said memory and reading of data from said memory; and wherein said video signal compression section has:

a filtering unit to change resolution of a video signal by performing a predetermined filtering operation on a reproduced video signal of a video signal compressed stream during a digital broadcast, the reproduced video signal being the output of the video signal decoding section;

a differential signal generator to generate a differential signal of the filtered reproduced video signal by employing said motion vector present in said video signal compressed stream which is the output of said video signal compressed stream which is the output of said video signal decoding section;

a DCT unit to perform DCT on the differential signal;

a quantizer to quantize data after DCT by employing said various flags which are input to the quantizer;

a variable-length encoder to variable-length encode the output of said quantizer; and said video signal compression section outputs a new video signal compressed stream.

With this, for example, either by thinning out DCT coefficients to reduce the quantity of data to be stored or to slow down the storing speed of requisite data, or by encoding DCT coefficients again, even in the case where video signals in various formats (resolution, frame frequency, etc.) are input, the video signals can be stored in a storage medium as a single format.

BRIEF DESCRIPTION OF THE DRAWINGS

The above and other objects and advantages will become apparent from the following detailed description when read in conjunction with the accompanying drawings wherein:

FIG. 1 is a block diagram of a video signal layering-encoding apparatus (system) according to a first embodiment of the present invention;

FIG. 6 is a block diagram of a video signal layering-encoding apparatus (system) according to a sixth embodiment of the present invention;

DESCRIPTION OF THE PREFERRED EMBODIMENTS

Figure 2:
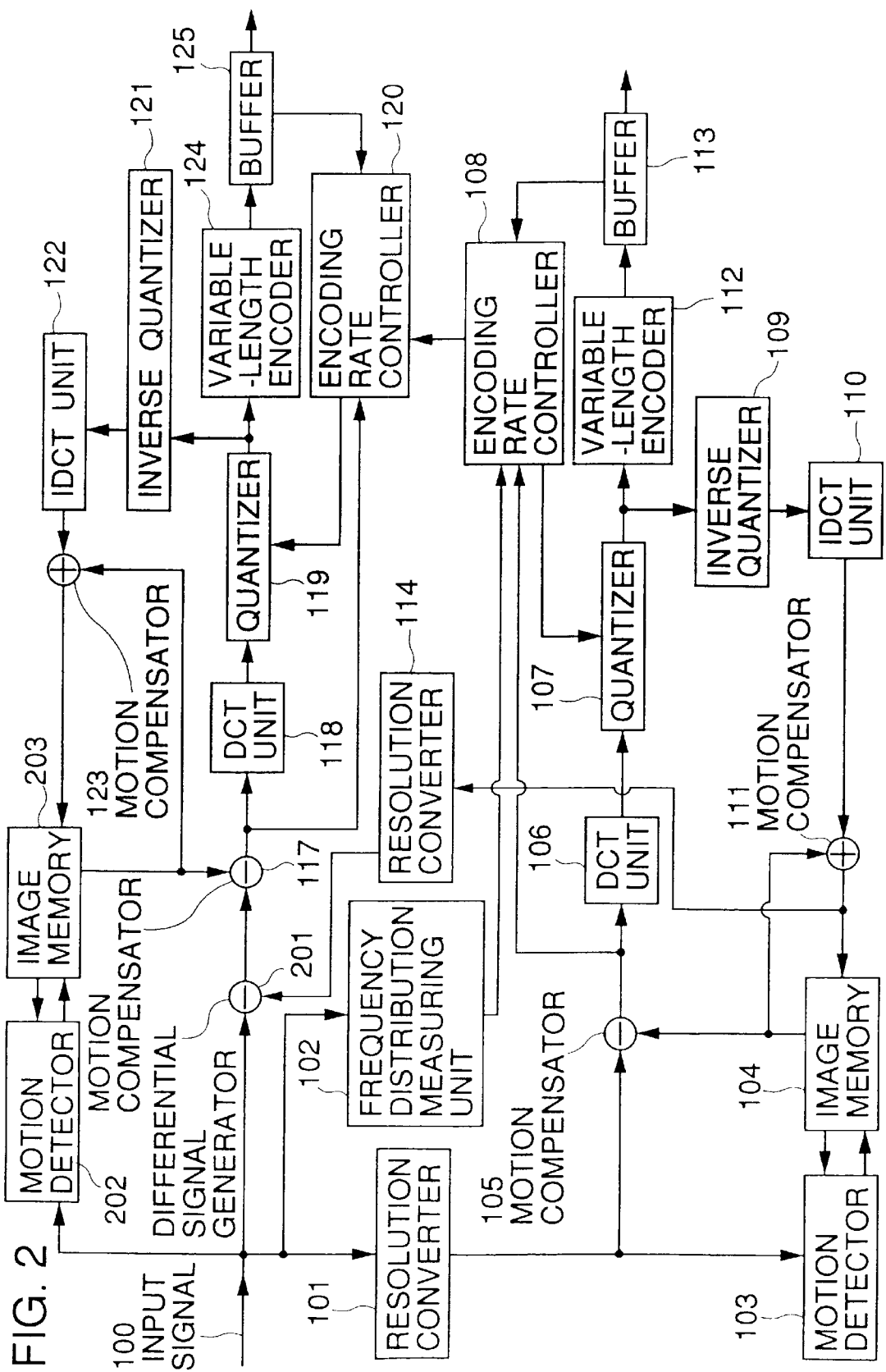
FIG. 2 is a block diagram of a video signal layering-encoding apparatus (system) according to a second embodiment of the present invention.

Embodiments of the present invention will hereinafter be described in reference to the drawings.

(First Embodiment)

Figure 1:
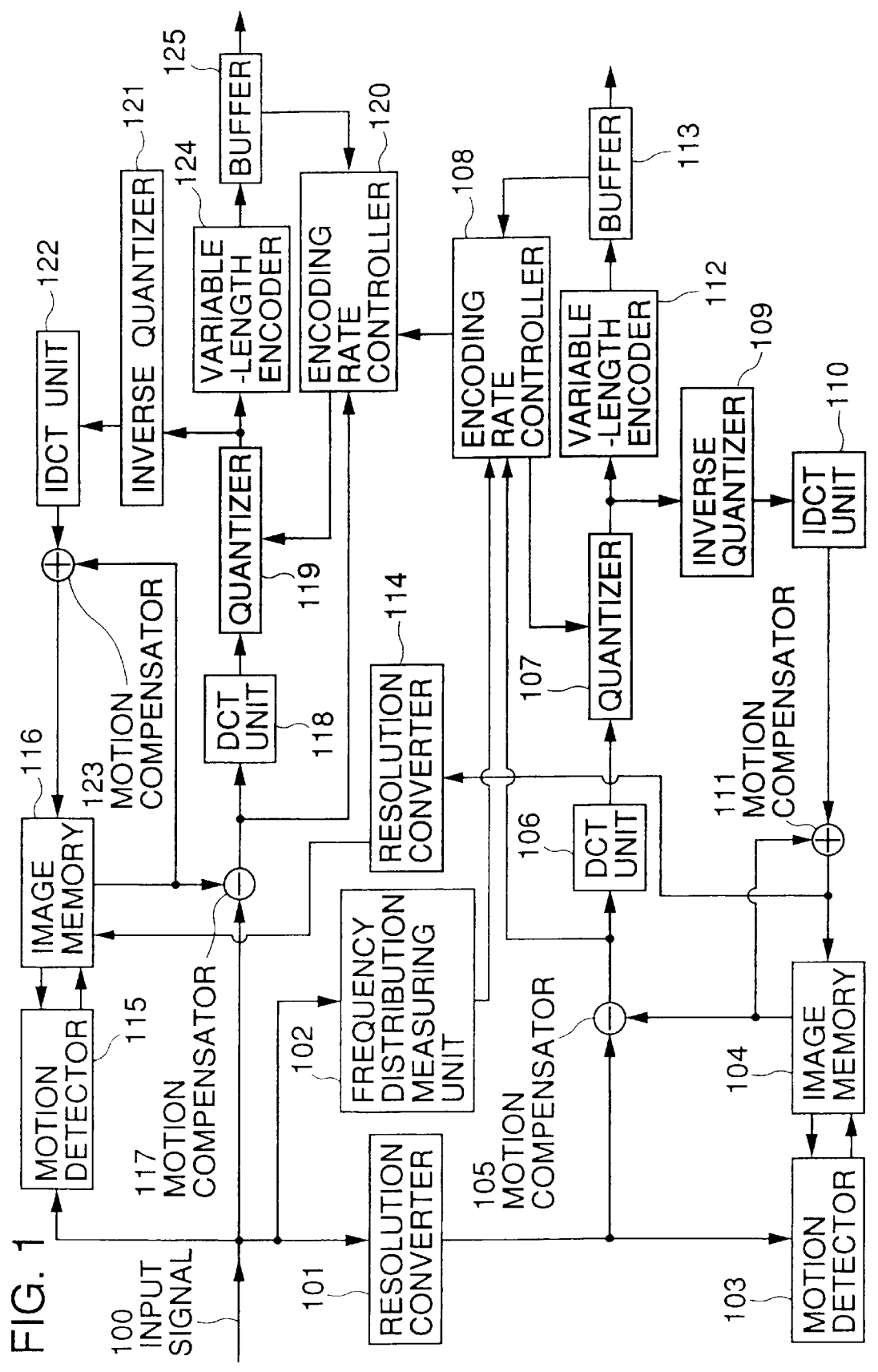

For a video signal layering-encoding apparatus (system) according to a first embodiment of the present invention, a description will be made of the constitution and operation in reference to FIG. 1. FIG. 1 illustrates a block diagram of the video signal layering-encoding system of this embodiment.

In the figure, 101 is a resolution converter, 102 a frequency distribution measuring unit, 103 a motion detector, 104 image memory, 105 a motion compensator, 106 a DCT unit, 107 a quantizer, 108 an encoding rate controller, 109 an inverse quantizer, 110 an IDCT unit, 111 a motion compensator, 112 a variable-length encoder, 113 a buffer, 114 a resolution converter, 115 a motion detector, 116 image memory, 117 a motion compensator, 118 a DCT unit, 119 a quantizer, 120 an encoding rate controller, 121 an inverse quantizer, 122 an IDCT unit, 123 a motion compensator, 124 a variable-length encoder, and 125 a buffer.

The main constitutional feature of this embodiment resides in that it is equipped with the frequency distribution measuring unit 102 and that the encoding rate controller 108 sends to the encoding rate controller 120 a predetermined control signal.

In this embodiment the frequency distribution measuring unit 102 employs a high-pass filter having a passband higher than a frequency limited by the resolution converter 101. When the quantity of the output (signal component) of this high-pass filter is less than a predetermined value, i.e., in the case where the quantity of the high frequency component contained in the output signal is small, the encoding rate controller 108 is constructed so that it increases the rate at which a low resolution video signal is encoded. In general, if there is a large quantity of motion between frames, an image itself will become ambiguous, and therefore, the quantity of the high frequency component contained in the frame will be reduced.

In the aforementioned constitution, the operation of the video signal layering-encoding system of this embodiment will next be described, and a description will be made of an embodiment of a video signal layering-encoding method according to the present invention.

An input video signal 100 is converted to a lower resolution video signal than the input video signal 100 by the resolution converter 101.

The frequency distribution measuring unit 102 measures and outputs how much the high frequency component that is not contained in the low resolution video signal converted by the resolution converter 101 is contained in the input video signal 100.

The motion detector 103 stores the output of the resolution converter 101 (the encoded frame of the input video signal 100) in the image memory 104 and also detects the motion of a macroblock unit from the encoded frame and the previously encoded and decoded past reference frame in the image memory 104.

The motion compensator 105 outputs a differential signal between the video signal of the encoded frame and the reproduced video signal of the reference frame detected by the motion detector 103 in the unit of a macroblock.

The discrete cosine transform (DCT) unit 106 outputs the output (differential signal) of the motion compensator 105 as DCT coefficients for each block.

The quantizer 107 quantizes the DCT coefficients by a quantization step specified by the encoding rate controller 108 and then outputs the quantized DCT coefficients.

The inverse quantizer 109 inversely quantizes the DCT coefficients quantized at the quantizer 107 by the quantized quantization step and then outputs the inversely quantized DCT coefficients.

The inverse DCT (IDCT) unit 110 outputs the output of the inverse quantizer 109 as inverse DCT coefficients.

The motion compensator 111 generates a reproduced video signal by adding the output of the IDCT unit 110 and the video signal of the reference frame whose motion was compensated at the motion compensator 105, and then stores the reproduced video signal in the large memory 104.

The variable-length encoder 112 variable-length encodes the output of the quantizer 107 and a predetermined flag and then outputs the variable-length encoded video signal.

The buffer 113 stores the variable-length encoded video signal temporarily and adjusts the output speed of output data thereof. That is, the buffer 113 outputs a variable-length encoded video signal with low resolution.

The encoding rate controller 108 determines the quantization step of the encoded frame for each macroblock, based on the output of the frequency distribution measuring unit 102, the output (differential signal) of the motion compensator 105, the encoded length of the encoded video signal, and the residual quantity information on the buffer 113.

That is, when the quantity of the high frequency component contained in the output signal of the frequency distribution measuring unit 102 is small, the encoding rate controller 108 increases the encoding rate at which a low resolution video signal is encoded, in comparison with the case where the quantity of the high frequency component is large. Furthermore, the encoding rate controller 108 sends the encoding rate information on a low resolution video signal to the encoding rate controller 120.

On the other hand, the resolution converter 114 resolution converts the output (reproduced video signal) of the motion compensator 111, i.e., converts the resolution of the reproduced video signal to the same resolution as the input video signal 100 and then stores it in the image memory 116.

The motion detector 115 stores the encoded frame of the input video signal 100 in the image memory 116 and also detects the motion of a macroblock unit from the encoded frame, the previously encoded and decoded past reference frame in the image memory 116, and from the reference frame that is the video signal of the same time among the low resolution signals which are the outputs of the resolution converter 114.

That is, in this motion detection, the motion detector 115 compares the encoded frame of the input video signal 100 with the above-mentioned past reference frame, the above-mentioned reference frame of the same time, and a reference frame generated by a combination of these, and then detects a reference frame with the highest correlation in the unit of a macroblock. The reference frame with the highest correlation is output from the image memory 116 to the motion compensator 117.

As previously described, generally if there is a large quantity of motion between frames, an image itself will become ambiguous, and therefore, the quantity of the high frequency component contained in the frame will be reduced. Therefore, when the quantity of motion is large, the correlation between the encoded frame and the reference frame of the same time becomes higher, and therefore, the reference frame of the same time is output from the image memory 116 to the motion compensator 117.

The motion compensator 117 outputs a differential signal between the video signal of the encoded frame and the reproduced video signal of the reference frame detected by the motion detector 115 in the unit of a macroblock.

Therefore, in the case of a large quantity of motion as in the above-mentioned, the quantity of the differential signal output by the motion compensator 117 is reduced. This means that in the case where the quantity of the high frequency component contained in the input signal 100 is small, the encoding rate controller 120 will have little influence on picture quality even if the rate at which a high resolution video signal is encoded is reduced. This point will be described in further detail later.

The DCT unit 118 outputs the output (differential signal) of the motion compensator 117 as DCT coefficients for each block.

The quantizer 119 quantizes the DCT coefficients by a quantization step specified by the encoding rate controller 120 and then outputs the quantized DCT coefficients.

An inverse quantizer 121 inversely quantizes the DCT coefficients quantized at the quantizer 119 by the quantized quantization step and then outputs the inversely quantized DCT coefficients.

The IDCT unit 122 outputs the output of the inverse quantizer 121 as inverse DCT coefficients.

The motion compensator 123 generates a reproduced video signal by adding the output of the IDCT unit 122 and the reproduced video signal of the reference frame whose motion was compensated at the motion compensator 117, and then stores the reproduced video signal in the image memory 116.

The variable-length encoder 124 variable-length encodes the output of the quantizer 119 and a predetermined flag and then outputs the variable-length encoded video signal.

The buffer 125 stores the variable-length encoded video signal temporarily and adjusts the output speed of output data thereof. That is, the buffer 125 outputs a variable-length encoded video signal with high resolution.

The encoding rate controller 120 determines the quantization step of the encoded frame for each macroblock, based on the encoded state of the low resolution signal estimated at the encoding rate controller 108 (i.e., the value of an encoding rate, etc.), the output (differential signal) of the motion compensator 117, the encoded length of the encoded video signal, and the residual quantity information of the buffer 125.

That is, the encoding rate controller 120 receives the encoding rate information on a low resolution video signal sent from the encoding rate controller 108. And when the encoding rate information from the encoding rate controller 108 indicates that an encoding rate is high, the encoding rate for a high resolution video signal is reduced so that it does not exceed the total encoding rate. In this case, as described above, picture quality will not be influenced so much even if the encoding rate for a high resolution video signal is reduced.

Thus, in this embodiment, i.e., when the quantity of the high frequency component contained in the input signal 100 is small, the encoding rate for a low resolution video signal is increased and the encoding rate for a high resolution video signal is reduced.

With this, the compression distortion of a low resolution video signal can be reduced, so a low resolution video signal with higher picture quality is obtained. Furthermore, with this, the picture quality of a high resolution video signal employing a low resolution video signal with enhanced picture quality can also be improved at the same time.

(Second Embodiment)

For the video signal layering-encoding apparatus (system) according to a second embodiment of the present invention, a description will be made of the constitution and operation in reference to FIG. 2. FIG. 2 illustrates a block diagram of the video signal layering-encoding system of this embodiment.

In FIG. 2, the same reference materials will be applied to the same parts as FIG. 1 and therefore a description thereof is omitted.

That is, in FIG. 2, 201 is a differential signal generator, 202 a motion detector, and 203 image memory.

As the operation from a resolution converter 101 to a buffer 113 is the same as the contents mentioned in FIG. 1, a description thereof is not given.

A resolution converter 114 converts the resolution of the output (reproduced video signal) of a motion compensator 111 to the same resolution as an input video signal 100 and outputs the converted signal.

The differential signal generator 201 generates a differential signal from the input video signal 100 and the output of the resolution converter 114.

The motion detector 202 stores the encoded frame of the input video signal 100 in the image memory 203 and also detects the motion of a macroblock unit from the encoded frame and the previously encoded and decoded past reference frame in the image memory 203.

A motion compensator 117 outputs a differential signal between the output of the differential signal generator 201 and the reproduced signal at the same position as the reference frame detected by the motion detector 202 in the unit of a macroblock.

This embodiment exhibits the following advantages in addition to the advantages mentioned in the above-mentioned first embodiment.

That is, by having the frequency distribution measuring unit 102 and the differential signal generator 201, encoding quantity control according to a frequency component contained in the input video signal 100 can be performed between layers in the hierarchical coding in which an encoded signal at a high resolution component is a differential signal with a video signal reproduced from a low resolution component.

Note that the motion detector 202 in this embodiment may use the output (video signal) of the resolution converter 114 when motion is detected.

(Third Embodiment)

Figure 3:
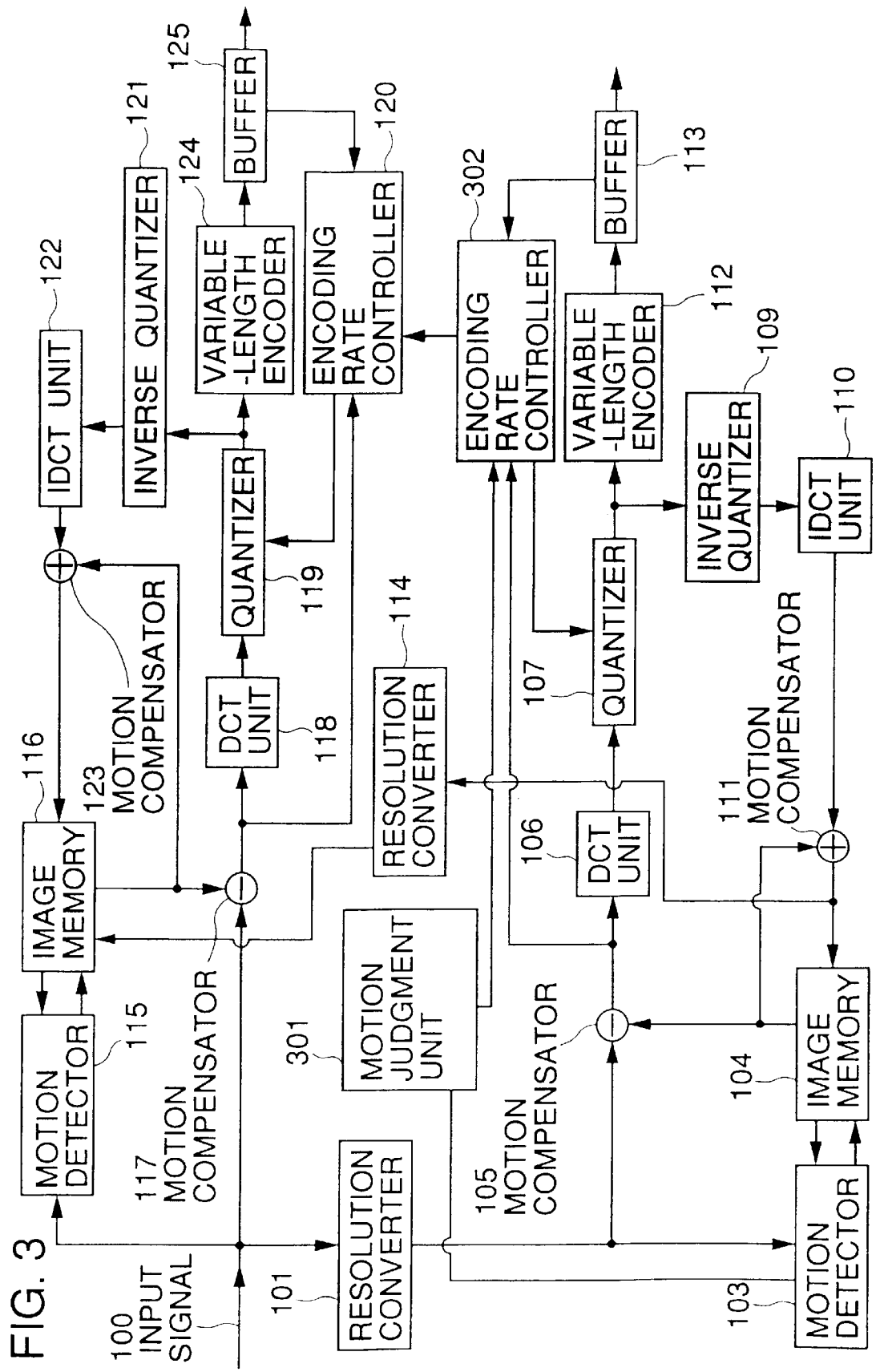
FIG. 3 is a block diagram of a video signal layering-encoding apparatus (system) according to a third embodiment of the present invention.

In FIG. 3, the same reference numerals will be applied to the same parts as FIG. 1 and therefore a description thereof is omitted.

That is, in FIG. 3, 301 is a motion judgment unit and 302 an encoding rate controller.

As shown in the figure, the motion judgment unit 301 judges the motion of an input video signal 100 from the motion detection result of a motion detector 103 and outputs the result of the judgment.

The encoding rate controller 302 determines the quantization step of the encoded frame of the input video signal 100 for each macroblock, based on the output of the motion judgment unit 301, the output (differential signal) of a motion compensator 105, the encoded length of the encoded video signal, and the residual quantity of a buffer 113.

In this embodiment, by having the motion judgment unit 301, encoding quantity control according to the motion of the input video signal 100 can be performed between layers.

Note that the motion judgment unit 301 in this embodiment may judge motion not by employing the result of the motion detected at the motion detector 103 but by employing the result of the motion detected at the motion detector 115 which detects motion only from the encoded frame of the original video signal and a reference frame.

(Fourth Embodiment)

Figure 4:
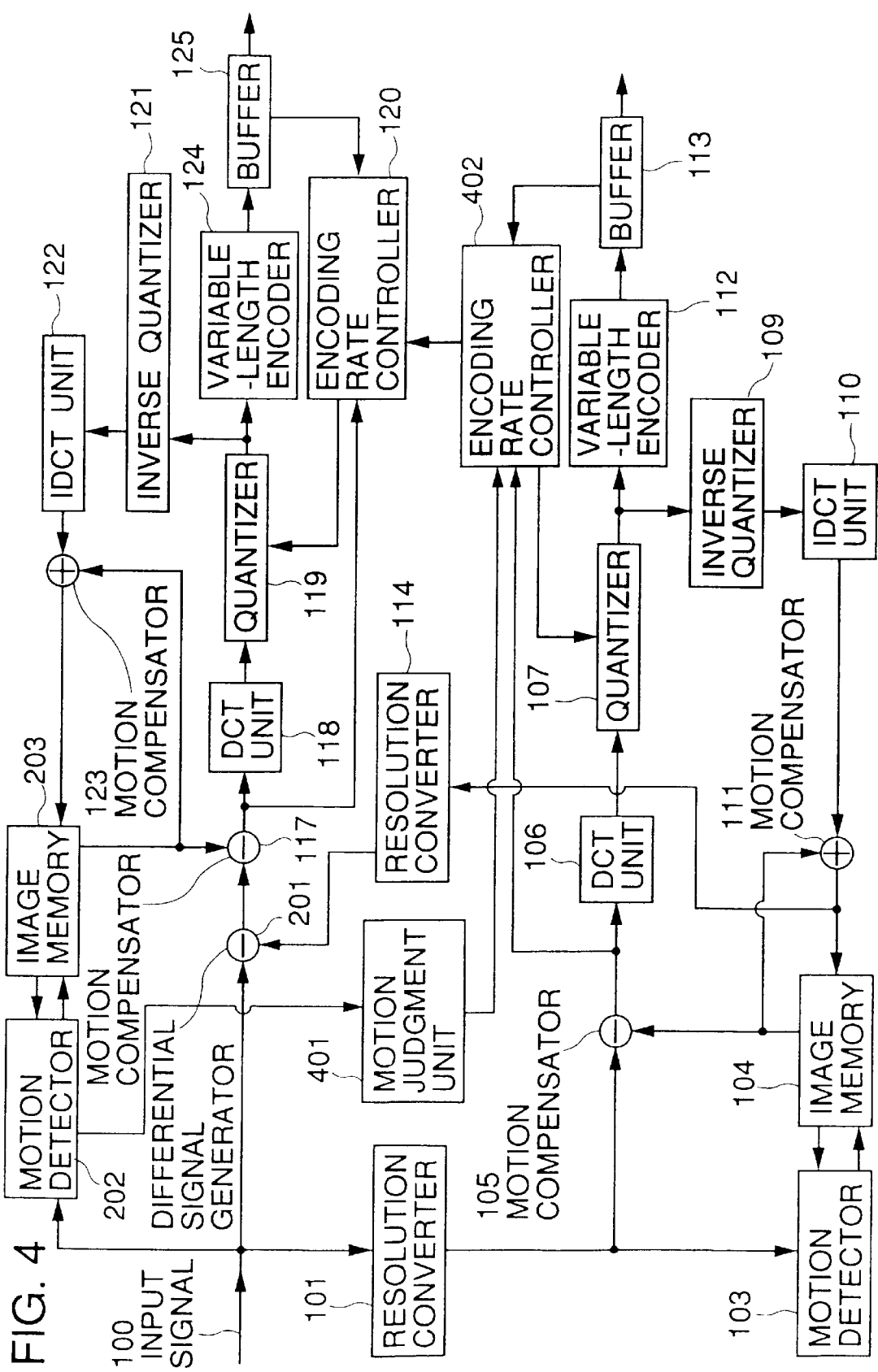
FIG. 4 is a block diagram of a video signal layering-encoding apparatus (system) according to a fourth embodiment of the present invention.

In FIG. 4, the same reference numerals will be applied to the same parts as FIGS. 1 and 2 and therefore a description thereof is omitted. In the figure, 401 is a motion judgment unit and 402 an encoding rate controller.

The motion judgment unit 401 judges the motion of an input video signal 100 from the motion detection result of a motion detector 202 and outputs the result of the judgment.

Thus, the motion judgment unit 401 can enhance motion judgment accuracy, unlike the above-mentioned embodiment where motion is judged based on the converted low resolution video signal.

The encoding rate controller 402 determines the quantization step of the encoded frame of the input video signal 100 for each macroblock, based on the output of the motion judgment unit 401, the output (differential signal) of a motion compensator 105, the encoded length of the encoded video signal, and the residual quantity of a buffer 113.

In this embodiment, by having the differential signal generator 201 and the motion judgment unit 401, encoding quantity control according to the motion of the input video signal 100 can be performed between layers in the hierarchical coding in which an encoded signal at a high resolution component is a differential signal with a video signal reproduced from a low resolution component.

Note that the motion judgment unit 401 in this embodiment may judge motion by employing the result of motion detected at the motion detector 103.

(Fifth Embodiment)

Figure 5:
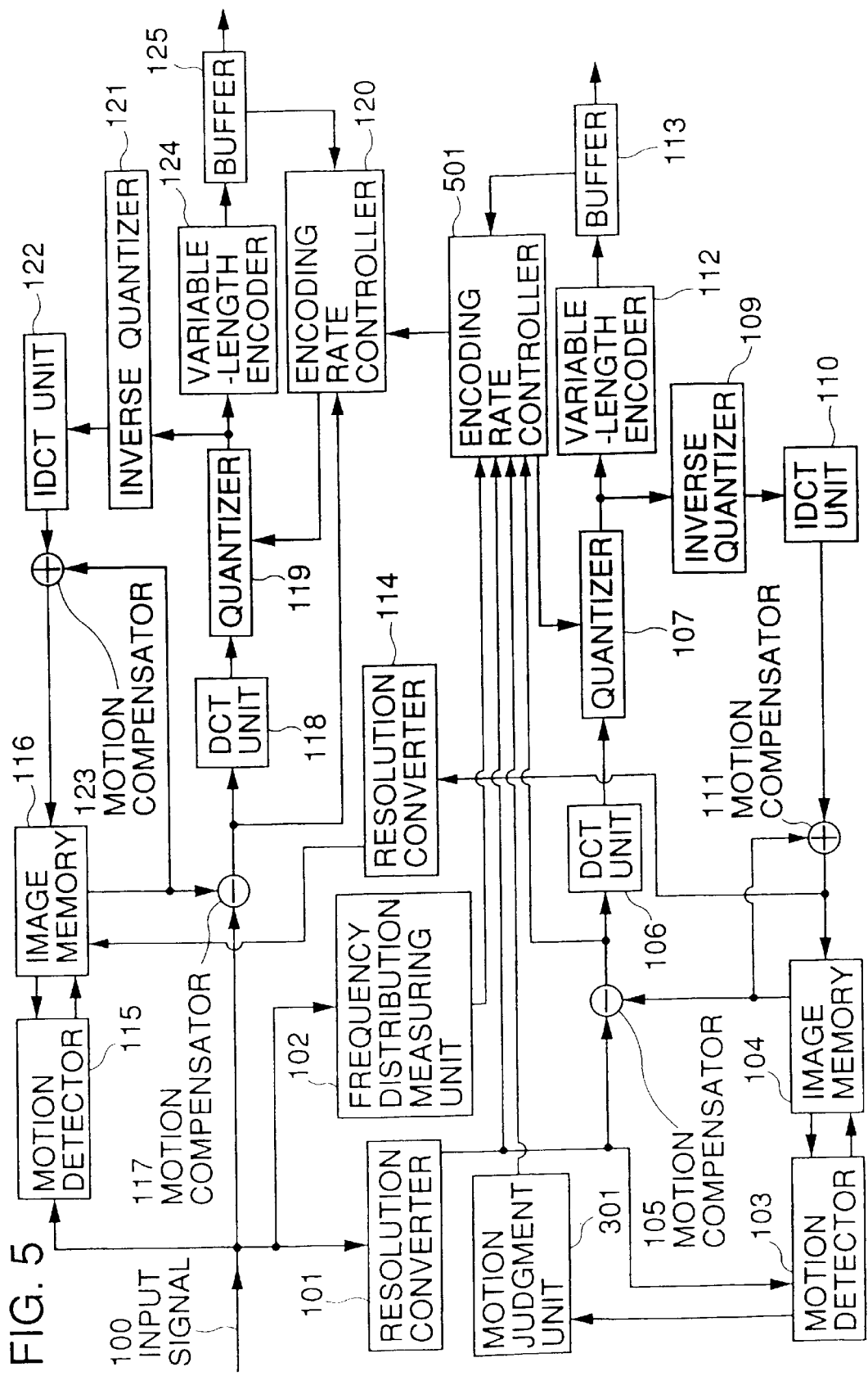
FIG. 5 is a block diagram of a video signal layering-encoding apparatus (system) according to a fifth embodiment of the present invention.

In FIG. 5, the same reference numerals will be applied to the same parts as FIGS. 1 and 3 and therefore a description thereof is omitted. In the figure, 501 is an encoding rate controller.

As shown in FIG. 5, the encoding rate controller 501 determines the quantization step of the encoded frame of an input video signal 100 for each macroblock, based on the output of a frequency distribution measuring unit 102, the output of a motion judgment unit 301, the output (differential signal) of a motion compensator 105, the encoded length of an encoded video signal, and the residual quantity of a buffer 113.

In this embodiment, by having the frequency distribution measuring unit 102, encoding quantity control according to a frequency component contained in the input video signal 100 can be performed between layers, and by having the motion judgment unit 301, encoding quantity control according to the motion of the input video signal 100 can be performed between layers.

Note that the motion judgment unit 301 in this embodiment may judge motion not by employing the result of the motion detected at the motion detector 103 but by employing the result of the motion detected at the motion detector 115 which detects motion only from the encoded frame of the original video signal and a reference frame.

(Sixth Embodiment)

Figure 6:
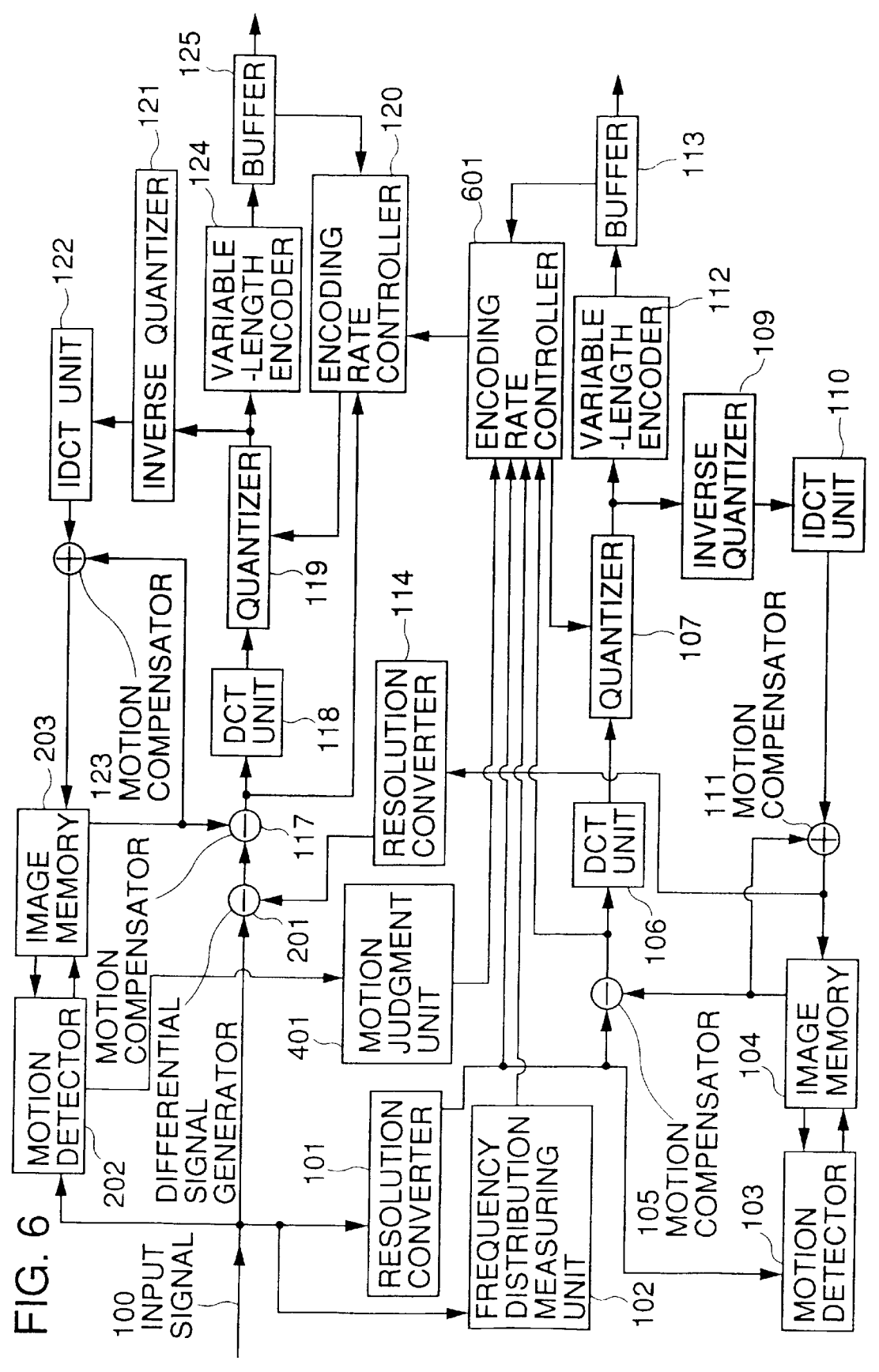

In FIG. 6, the same reference numerals will be applied to the same parts as FIGS. 1, 2, and 4 and therefore a description thereof is omitted. In the figure, 601 is an encoding rate controller.

As shown in FIG. 6, the encoding rate controller 601 determines the quantization step of the encoded frame of an input video signal 100 for each macroblock, based on the output of a frequency distribution measuring unit 102, the output of a motion judgment unit 401, the output (differential signal) of a motion compensator 105, the encoded length of an encoded video signal, and the residual quantity of a buffer 113.

Note that the motion judgment unit 401 in this embodiment may judge motion by employing the result of motion detected at the motion detector 103.

In the aforementioned embodiments, although the frequency distribution measuring means of the present invention employs a high-pass filter having a passband higher than a frequency limited by the resolution converter 101, the present invention is not limited to this, For example, the frequency distribution measuring means may be constructed as follows.

That is, when the resolution converter 101 is limited by a low-pass filter and also the frequency characteristic is represented by F, a high-pass filter represented by 1-F may be employed. In this case, when the output signal component of the high-pass filter is less than a predetermined value, the rate at which a signal is encoded by the encoding rate controller 108, 501 or 601 is increased.

As another constitution, the frequency distribution measuring unit 102 may convert an input video signal to a low resolution video signal in the same manner as the resolution converter 101 and add the absolute value sum of a differential signal between a reproduced video signal with the same resolution as the input video signal and the input video signal in the same manner as the resolution converter 114. In this case, when the absolute value sum is small, the rate at which a signal is encoded by the encoding rate controller 108, 501 or 601 is increased.

As still another constitution, the frequency distribution measuring unit 102 may convert an input video signal to a low resolution video signal in the same manner as the resolution converter 101 and add the absolute value sum of a differential signal between a reproduced video signal with the same resolution as the input video signal and the input video signal in the same manner as the resolution converter 114 only when the absolute value sum is greater than a predetermined value. In this case, when the absolute value sum is small, the rate at which a signal is encoded by the encoding rate controller 108, 501 or 601 is increased.

Also, the motion judgment unit 301 and motion judgment unit 401 in the aforementioned embodiment may increase the rate at which a signal is encoded by the encoding rate controller 108, 501 or 601, when motion is great.

In the above-mentioned embodiments, while it has been described that the sum of the encoded bit streams output from the buffers 113 and 125 is always constant per unit time, the present invention is not limited to this. Even if the sum of the bit streams varies with time, the above-mentioned embodiments will be applicable.

(Seventh Embodiment)

Figure 7:
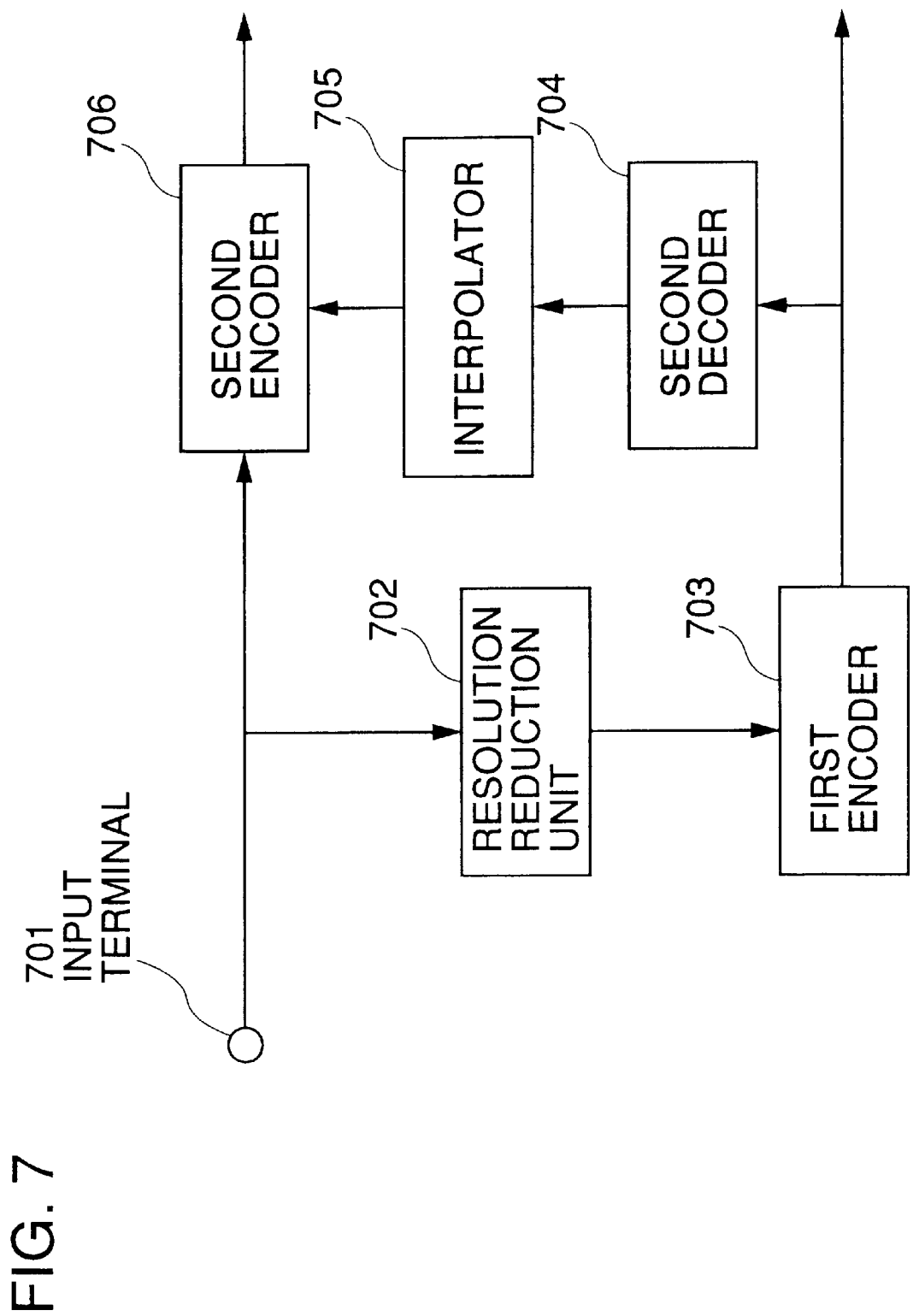
FIG. 7 is a block diagram of a video signal layering-encoding apparatus (system) according to a seventh embodiment of the present invention.

For the video signal layering-encoding apparatus (system) according to a seventh embodiment of the present invention, a description will be made of the constitution and operation in reference to FIG. 7. FIG. 7 illustrates a block diagram of the video signal layering-encoding system of this embodiment.

In the figure, 701 is an input terminal to which a video signal is input, 702 a resolution reduction unit for reducing the resolution of the input video signal to a predetermined resolution, 703 a first encoder for encoding the input video signal at a low bit rate, 704 a second decoder for decoding the input video signal at a low bit rate, 705 an interpolator for interpolating the number of the pixels of the input signal so that it becomes a predetermined number of pixels, and 706 a second encoder for encoding the input video signal at a low bit rate.

The operation of the aforementioned constitution will hereinafter be described.

A high resolution signal input through the input terminal 701 is output to the second encoder 706 and the resolution reduction unit 702. The resolution reduction unit 702 reduces the resolution of the input signal to a predetermined resolution and outputs the resolution reduced signal to the first encoder 703. The first encoder 703 encodes the input signal at a low bit rate and outputs the encoded data to the second decoder 704. The second decoder 704 decodes the input signal at a low bit rate and outputs the decoded signal to the interpolator 705. The interpolator 705 interpolates the input video signal so that the number of the pixels thereof becomes the same number of pixels as the high resolution signal, and then outputs the interpolated signal to the second encoder 706.

In the second encoder 706, the high resolution signal is encoded at a low bit rate and output by either spatial resolution predictive coding which employs prediction in a spatial axis direction (e.g., encoding of a difference between an interpolated signal and a high resolution signal), intraframe coding which employs data within the frame of a high resolution signal, interframe forward predictive coding which employs forward prediction in the time axis direction of a high resolution signal, or interframe bidirectional predictive coding which employs bidirectional prediction in the time axis direction of a high resolution signal.

Here, when the second encoder 706 performs interframe bidirectional predictive coding, predicted differential data is not encoded, but only the motion vector detected by employing interframe bidirectional prediction is encoded.

Generally, since a bidirectionally predicted frame is often the average of two frames, it becomes an object of encoding, but even if a motion vector alone were encoded, a great influence will not occur on picture quality. In the case where a high resolution signal is decoded, it is also possible to employ the interpolated image of the decoded image of a low resolution signal. Therefore, even if a motion vector alone were encoded, picture quality will not be degraded.

As described above, the video signal encoding system of the present invention is capable of increasing the encoding efficiency of a high resolution signal, because the encoding quantity of a bidirectionally predicted and coded high resolution signal can be reduced by encoding only a motion vector employing interframe bidirectional prediction.

(Eighth Embodiment)

Figure 8:
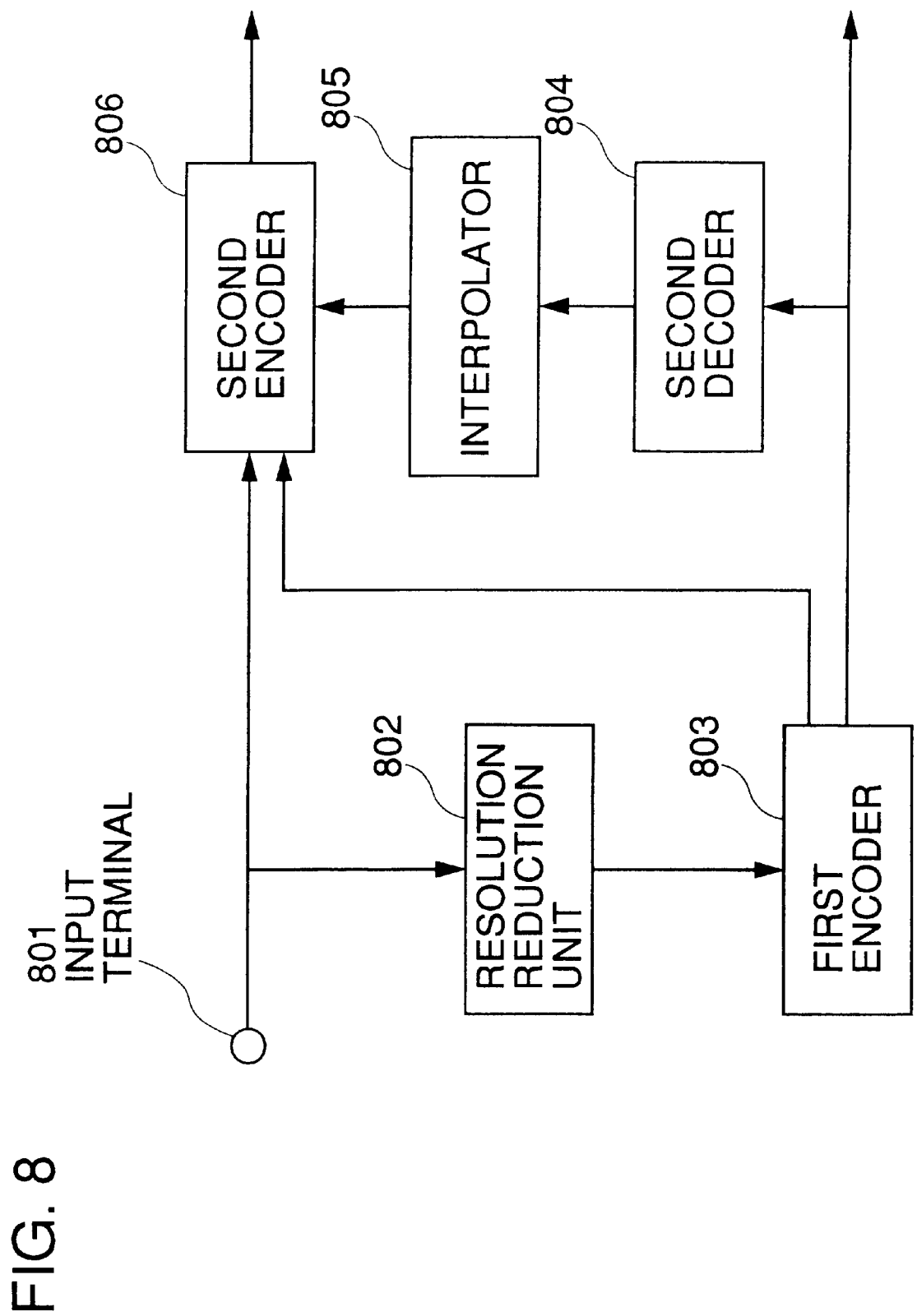
FIG. 8 is a block diagram of a video signal layering-encoding apparatus (system) according to an eighth embodiment of the present invention and a ninth embodiment of the present invention.

In FIG. 8, 801 is an input terminal to which a video signal is input, 802 a resolution reduction unit for reducing the resolution of the input video signal to a predetermined resolution, 803 a first encoder for encoding the input video signal at a low bit rate, 804 a second decoder for decoding the input video signal at a low bit rate, 805 an interpolator for interpolating the number of the pixels of the input signal so that it becomes a predetermined number of pixels, and 806 a second encoder for encoding the input video signal with a predetermined control determined by input information.

The operation of the aforementioned constitution will hereinafter be described.

A high resolution signal input through the input terminal 801 is output to the second encoder 806 and the resolution reduction unit 802. The resolution reduction unit 802 reduces the resolution of the input signal to a predetermined resolution and ouputs the resolution reduced signal to the first encoder 803.

The first encoder 803 encodes a low resolution signal at a low bit rate by either (1) intraframe coding which employs data within the frame of a low resolution signal, (2) interframe forward predictive coding which employs forward prediction in the time axis direction of a low resolution signal, or (3) interframe bidirectional predictive coding which employs bidirectional prediction in the time axis direction of a low resolution signal. The first encoder 803 outputs the encoded data to the second decoder 804 and also outputs to the second encoder 806 which of the intraframe coding, the interframe forward predictive coding, and the interframe bidirectional predictive coding was employed to encode the encoded data. The second decoder 804 decodes the input signal at a low bit rate and outputs the decoded signal to the interpolator 805. The interpolator 805 interpolates the input video signal so that the number of the pixels thereof becomes the same number of pixels as the input video signal, and then outputs the interpolated signal to the second encoder 806.

In the second encoder 806, the high resolution signal is encoded at a low bit rate and output by (1) spatial resolution predictive coding which employs prediction in a spatial axis direction (e.g., encoding of a difference between an interpolated signal and a high resolution signal) and (2) coding of the same type as the coding type employed when each frame converted to a low resolution signal is encoded at the first encoder 803. As previously described, the information on which encoding type was employed in the first encoder 802 is sent from the first encoder 803 to the second encoder 806.

Also, when the second encoder 806 in this embodiment, as with the seventh embodiment, performs interframe bidirectional predictive coding, predicted differential data is not encoded, but only the motion vector detected by employing interframe bidirectional prediction is encoded.

Thus, in the video signal encoding system in this embodiment, in addition to the same advantage as the seventh embodiment, frame encoding types become the same when a low resolution signal and a high resolution signal are encoded, so it becomes possible to use the motion vector of a low resolution signal in encoding a high resolution signal, and consequently, error tolerance is increased.

As a variation of the above-mentioned embodiment, the present invention may be constituted so that when the first encoder 803 performs intraframe coding, the above-mentioned second encoder 806 performs the intraframe coding on a frame corresponding to the frame. With this constitution, the degree of importance relative to an error in the above-mentioned frame is increased, and therefore, by strengthening error tolerance in that frame, error tolerance in the entire stream can be easily strengthened.

(Ninth Embodiment)

A ninth embodiment of the present invention is the same as FIG. 8 and differs only in the operation of the second encoder 806.

The operation of the second encoder 806 in this embodiment will hereinafter be described.

In the second encoder 806 in this embodiment, for a frame corresponding to a frame encoded at the first encoder 803 by either intraframe coding or interframe forward directional predictive coding, a motion vector employing interframe bidirectional prediction is encoded, and a frame corresponding to a frame which is encoded by interframe bidirectional predictive coding is encoded by either intraframe coding or interframe forward directional predictive coding.

In the coding method employing the time axis direction of a video signal, in order to enhance picture quality, an encoding quantity is allocated to intraframe coding or interframe bidirectional coding and is not allocated to interframe bidirectional coding which is the average of two frames. Therefore, generally picture quality is better in intraframe coding or interframe forward direction coding than in interframe bidirectional coding.

Hence, by setting the above-mentioned encoding mode, a reference frame, which is encoded by spatial inter-resolution predictive coding when a high resolution signal is encoded by interframe bidirectional predictive coding, is encoded by either the intraframe coding or interframe forward directional predictive coding of a low resolution signal. Therefore, since the reference frame in this embodiment has higher picture quality as compared with the eighth embodiment, spatial inter-resolution predictive coding can be more effectively utilized. As a result, encoding of a motion vector becomes unnecessary and the encoding efficiency can be enhanced.

Note that the encoding of a motion vector becomes unnecessary only when the first encoder 803 performs interframe forward directional predictive coding.

As described above, in the video signal encoding system in this embodiment, in addition to the same advantage as the seventh embodiment, the picture quality of a reference frame obtained by spatial inter-resolution prediction is enhanced when interframe bidirectional predictive coding is performed, whereby the encoding efficiency of a high resolution signal can be improved.

(Tenth Embodiment)

A tenth embodiment of the present invention is the same as FIG. 8 and differs only in the operation of the second encoder 806.

The operation of the second encoder 806 in this embodiment will hereinafter be described.

In the second encoder 806 in this embodiment, for a frame corresponding to a frame encoded at the first encoder 803 by either interframe forward directional coding or interframe bidirectional predictive coding, encoding of the same type is performed, and a frame corresponding to a frame encoded at the first encoder 803 by intraframe coding is encoded at a low bit rate by employing only spatial inter-resolution predictive coding.

Thus, since a high resolution signal is not encoded by intraframe coding, an encoding quantity can be reduced and therefore the encoding efficiency of a high resolution signal can be improved.

(Eleventh Embodiment)

An eleventh embodiment of the present invention is the same as FIG. 7 and differs only in the operation of the second encoder 706.

The operation of the second encoder 706 in this embodiment will hereinafter be described.

In the second encoder 706 in this embodiment, encoding is performed at intervals of M frames (where M≧1) by employing only spatial inter-resolution predictive coding. The other frames are encoded by either interframe forward directional predictive coding or interframe bidirectional predictive coding.

Thus, as with the tenth embodiment, a high resolution signal is not encoded by intraframe coding, so that the encoding quantity can be reduced and the encoding efficiency of a high resolution signal can be increased. Furthermore, as a difference with an interpolated image is encoded at intervals of M frames, error propagation in a time axis direction can be stopped at intervals of M frames. Therefore, as M becomes smaller, this embodiment has better error tolerance. If M is less than the GOP unit in the tenth embodiment, this embodiment will have better error tolerance than the tenth embodiment.

(Twelfth Embodiment)

A twelfth embodiment of the present invention is the same as FIG. 8 and differs only in the operation of the first and second encoders 803 and 806.

The operation of the first and second encoders 803 and 806 in this embodiment will hereinafter be described.

The first encoder 802 in this embodiment encodes an input signal at a low bit rate and outputs the encoded data to a second decoder 804. The first encoder 803 also outputs both the motion vector used in the encoding and the encoding type to the second encoder 806. In the second encoder 806, for the frame of the encoding type encoded at the first encoder 803 by either interframe forward directional predictive coding or interframe bidirectional predictive coding, the input motion vector multiplied by a predetermined number is used as a motion vector in order to exclude the data of the motion vector, and then encoding is performed.

Therefore, in the video signal encoding system in this embodiment, the overall circuit size can be reduced because the motion vector of the frame of a high resolution signal is not detected, and the encoding efficiency of a high resolution signal can be increased because a motion vector is not encoded.

(Thirteenth Embodiment)

Figure 9:
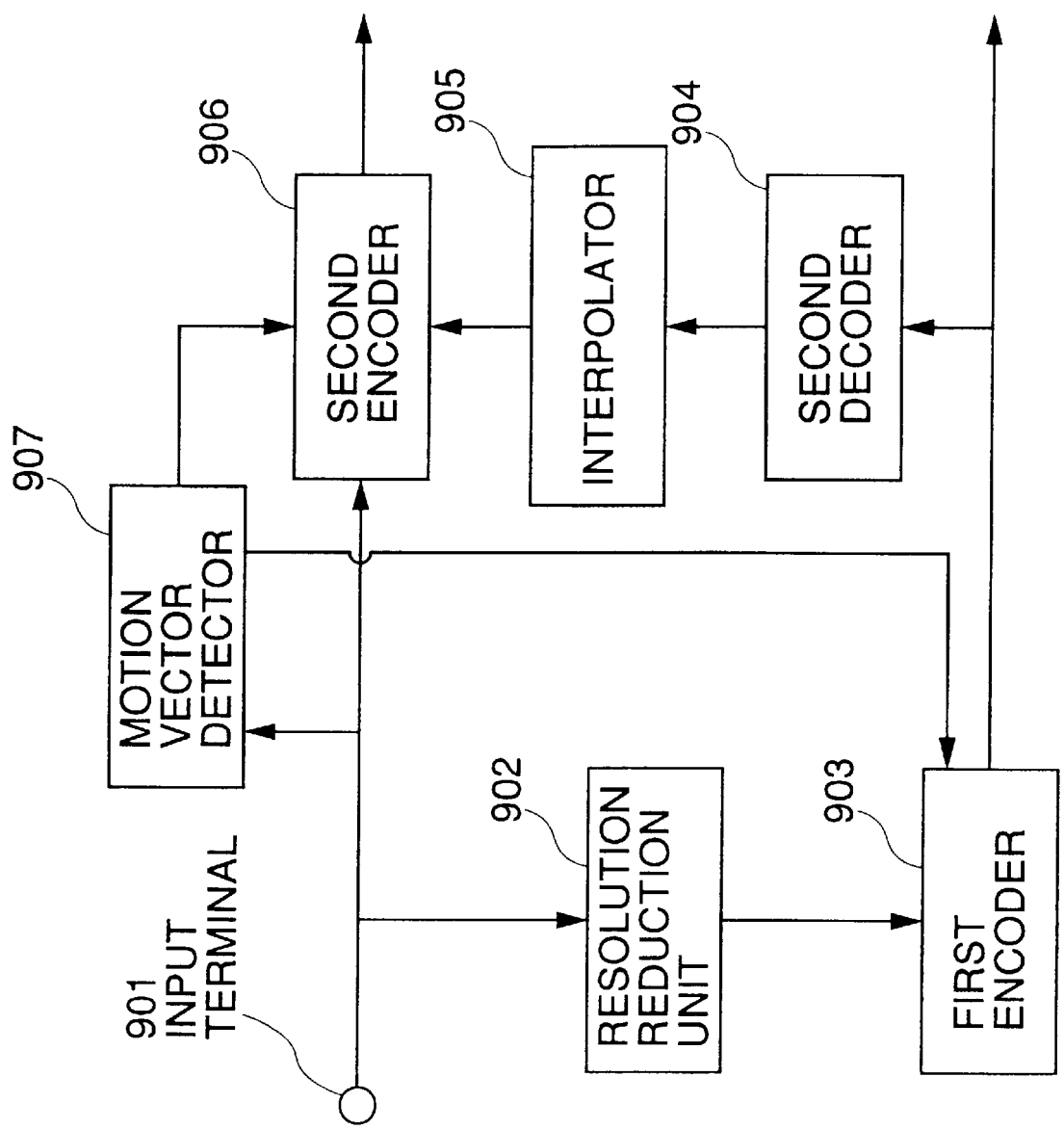
FIG. 9 is a block diagram of a video signal layering-encoding apparatus (system) according to a 13th embodiment of the present invention.

For the video signal layering-encoding apparatus (system) according to a thirteenth embodiment of the present invention, a description will be made of the constitution and operation in reference to FIG. 9. FIG. 9 illustrates a block diagram of the video signal layering-encoding apparatus (system) of this embodiment.

In the figure, 901 is an input terminal to which a video signal is input, 902 a resolution reduction unit for reducing the resolution of the input video signal to a predetermined resolution, 903 a first encoder for encoding the input video signal at a low bit rate by employing input information, 904 a second decoder for decoding the input video signal at a low bit rate, 905 an interpolator for interpolating the number of the pixels of the input signal so that it becomes a predetermined number of pixels, 906 a second encoder for encoding the input video signal by employing input information, and 907 a motion vector detector for detecting the motion vector between input signals.

The operation of the aforementioned constitution will hereinafter be described.

A high resolution signal input through the input terminal 901 is output to the motion vector detector 907, the second encoder 906, and the resolution reduction unit 902. The motion vector detector 907 detects the motion vector of the input signal and outputs the detected motion vector to the second encoder 906 and the first encoder 903. The resolution reduction unit 902 reduces the resolution of the input signal to a predetermined resolution and outputs the resolution reduced signal to the first encoder 903. The first encoder 903 uses the input motion vector multiplied by a predetermined number as a motion vector so that a low resolution signal is encoded at a low bit rate. The first encoder 903 outputs the encoded data to the second decoder 904. The second decoder 904 decodes the input signal at a low bit rate and outputs the decoded signal to the interpolator 905. The interpolator 904 interpolates the input video signal so that the number of the pixels thereof becomes the same number of pixels as the input video signal, and then outputs the interpolated signal to the second encoder 906.

The second encoder 906 encodes and outputs a high resolution signal at a low bit rate by using both spatial resolution predictive coding which employs prediction in a spatial axis direction (e.g., encoding of a difference between an interpolated signal and a high resolution signal) and the input motion vector. In this case, the motion vector is also encoded.

Note that, due to the same reason as the above-mentioned embodiment, the first encoder 903 encodes and outputs a low resolution signal at a low bit rate, excluding a motion vector.

Therefore, in the video signal encoding system in this embodiment, the overall circuit size can be reduced because the motion vector of the frame of a low resolution signal is not detected, and the encoding efficiency of a high resolution signal can be increased because a motion vector is not encoded.

Also, this embodiment enhances motion vector accuracy, because it is constituted so that a motion vector between input signals with high resolution is detected.

(Fourteenth Embodiment)

Figure 10:
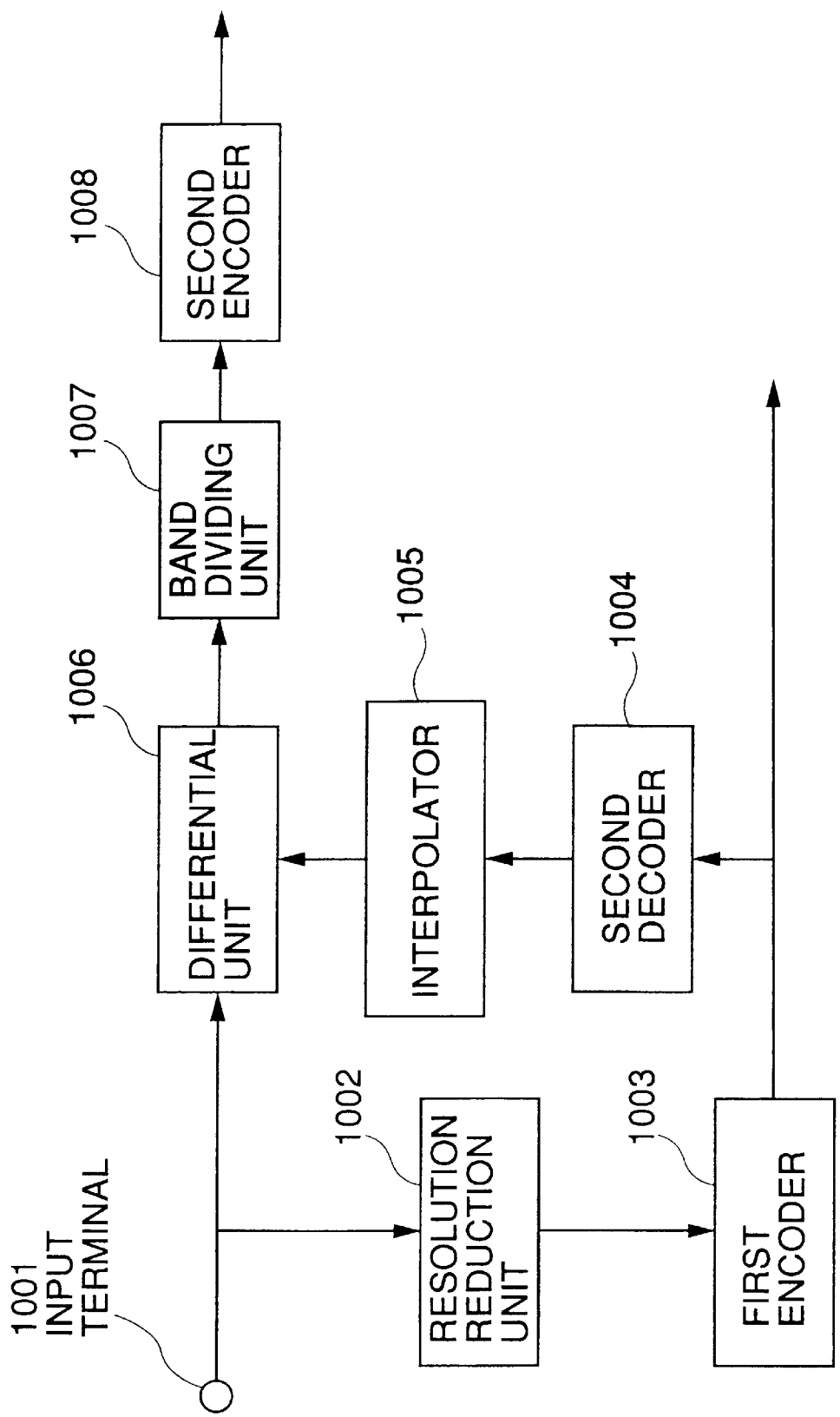
FIG. 10 is a block diagram of a video signal layering-encoding apparatus (system) according to an 14th embodiment of the present invention.

In FIG. 10, 1001 is an input terminal to which a video signal is input, 1002 a resolution reduction unit for reducing the resolution of the input video signal to a predetermined resolution, 1003 a first encoder for encoding the input video signal at a low bit rate, 1004 a second decoder for decoding the input video signal at a low bit rate, 1005 an interpolator for interpolating the number of the pixels of the input signal so that it becomes a predetermined number of pixels, 1006 a differential unit for computing a difference between input signals, 1007 a band divider for dividing the band of the input signal, and 1008 a second encoder for encoding the input video signal.

The operation of the aforementioned constitution will hereinafter be described.

A high resolution signal input through the input terminal 1001 is output to the resolution reduction unit 1002 and differential unit 1006. The resolution reduction unit 1002 reduces the resolution of the input signal to a predetermined resolution and outputs the resolution reduced signal to the first encoder 1003. The first encoder 1003 encodes the input signal at a low bit rate and outputs the encoded data to the second decoder 1004. The second decoder 1004 decodes the input signal at a low bit rate and outputs the decoded signal to the interpolator 1005. The interpolator 1005 interpolates the input video signal so that the number of the pixels thereof becomes the same number of pixels as the input video signal, and then outputs the interpolated signal to the differential unit 1006. The differential unit 1006 computes differential data between the same frames of the input signals and outputs the differential data to the band divider 1007. The band divider 1007 divides the input signal into a plurality of video signals having a predetermined band and outputs them to the second encoder 1008. The second encoder 1008 encodes and outputs the input signals at a low bit rate.

As described above, the video signal encoding system in this embodiment employs different kinds of encoding methods in a low resolution signal and a high resolution signal. Therefore, if both signals are combined together, a high resolution signal can be encoded so that it is effective. As a result, it becomes possible to enhance the picture quality of a high resolution signal.

(Fifteenth Embodiment)

Figure 11:
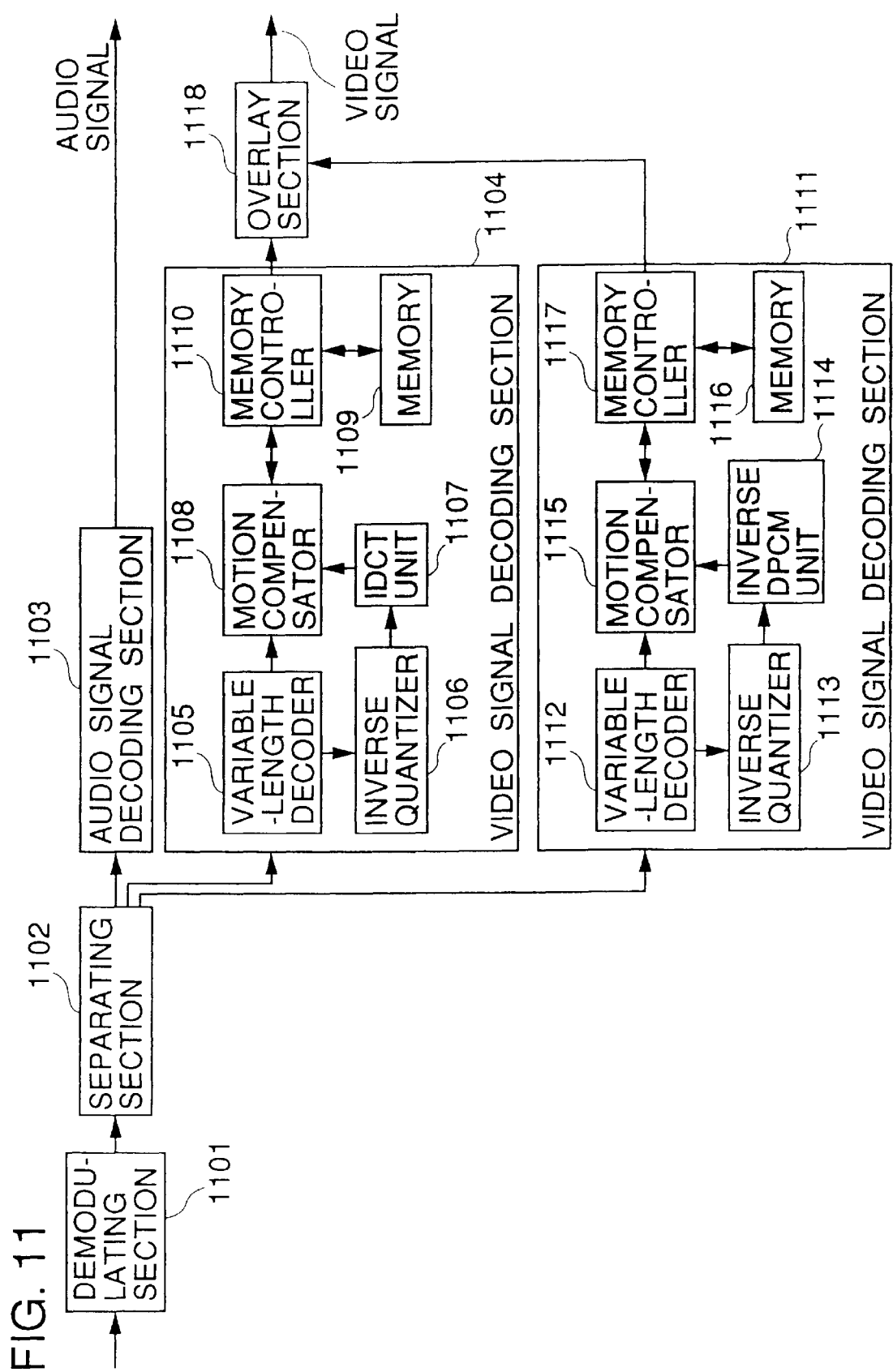
FIG. 11 is a block diagram of a first digital broadcast decoding apparatus (system) according to a 15th embodiment of the present invention.

In FIG. 11, 1101 is a demodulating section, 1102 a separating section, 1103 an audio signal decoding section, 1104 a video signal decoding section, 1105 a variable-length decoder, 1106 an inverse quantizer, 1107 an IDCT unit, 1108 a motion compensator, 1109 memory, 1110 a memory controller, 1111 a video signal decoding section, 1112 a variable-length decoder, 1113 an inverse quantizer, 1114 an inverse differential pulse code modulation (DPCM) unit, 1115 a motion compensator, 1116 memory, 1117 a memory controller, and 1118 an overlay section.

The operation in the aforementioned constitution will hereinafter be described.

The demodulating section 1101 performs a predetermined demodulation on a received digital broadcast, thereby generating an MPEG stream.

The separating section 1102 separates the video and audio signal compressed streams on a predetermined channel from the generated MPEG stream.

The audio signal decoding section 1103 decodes the audio signal compressed stream and outputs an audio signal.

In the video signal decoding section 1104, (1) the variable-length decoder 1105 variable-length decodes the aforementioned video signal compressed stream and outputs the motion vector of a macroblock unit, a quantization step, and DCT coefficients, (2) the inverse quantizer 1106 inversely quantizes the DCT coefficients by the quantization step decoded in the unit of a macroblock, (3) the IDCT unit 1107 outputs the inversely quantized DCT coefficients as IDCT coefficients, (4) the motion compensator 1108 reproduces a video signal from the IDCT coefficients obtained by employing a motion vector and also from the signal stored in the memory 1109 in a macroblock unit, and (5) the memory controller 1110 controls the storage of the reproduced video signal to the memory 1109, the output of the video signal stored in the memory 1109 to the motion compensator 1108, and the output of the reproduced video signal, thereby outputting a decoded video signal A.

On the other hand, in the video signal decoding section 1111, (1) the variable-length decoder 1112 variable-length decodes the video signal compressed stream and outputs the motion vector of a macroblock unit, a quantization step, and DC coefficients, (2) the inverse quantizer 1113 inversely quantizes by the decoded quantization step only the DC coefficients quantized at the time of encoding, (3) the inverse DPCM unit 1114 performs inverse DPCM on only the DC coefficients on which DPCM was performed at the time of encoding, (4) the motion compensator 1115 reproduces a video signal from a signal reproduced by employing a motion vector multiplied by ⅛ and also from a signal stored in the memory 1116 in a macroblock unit, and (5) the memory controller 1117 controls the storage of the reproduced video signal to the memory 1116, the output of the video signal stored in the memory 1116 to the motion compensator 1115, and the output of the reproduced video signal, thereby outputting a decoded video signal B.

In the overlay section 1118, the video signal B (which is ⅛ of the video signal A in both horizontal and vertical directions) reproduced at the video signal decoding section 1111 is overlaid at a predetermined position on the video signal A reproduced at the video signal decoding section 1104, and the overlaid signal is output.

The video signal decoding section 1111 in this embodiment is realizable by a signal process very easy as compared with the video signal decoding section 1104 and with a less memory quantity (specifically, memory capacity of 1/64 of the memory 1109), so it is also realizable by software. Also, a predetermined vector transformation may be employed to obtain the motion vector multiplied by ⅛.

With this, the digital broadcast decoding system in this embodiment can readily display a broadcasting program on a different channel onto a small screen within a main screen during reception of digital broadcasts, by having the structurally simple video signal decoding section 1111 in a conventional digital broadcast decoding system.

Next, the operation of the above-mentioned video signal decoding section 1111 will be described further in reference to FIG. 15.

Figure 15:
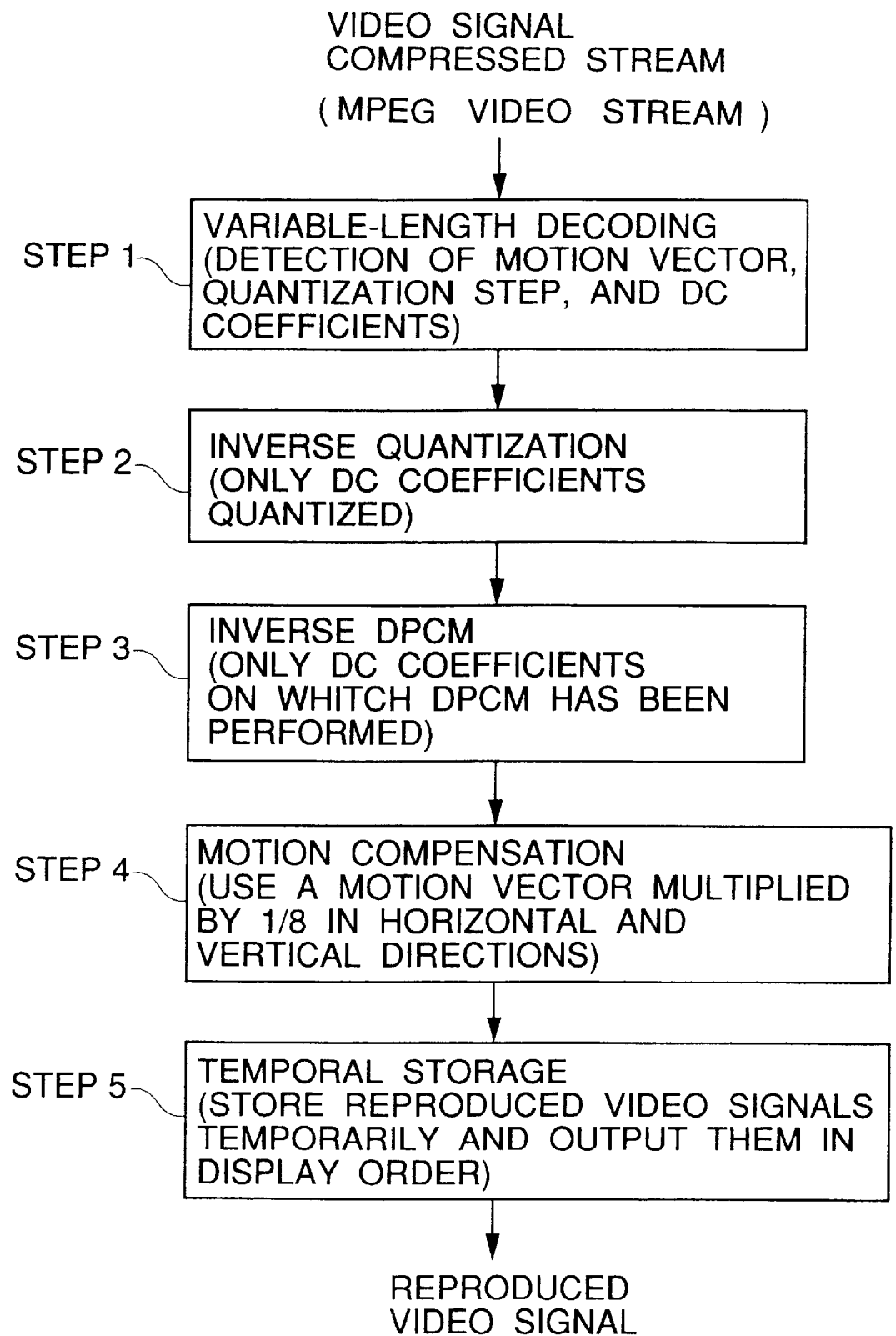
FIG. 15 is a flowchart of a video signal decoding system according to the 15th embodiment of the present invention.

FIG. 15 shows a flowchart used to explain algorithm.

In the figure, in step 1, variable-length decoding is performed on the video signal stream compressed by the MPEG standard, whereby only the motion vector, quantization step, and DC coefficients are extracted.

In step 2, only when the DC coefficients have been quantized, they are inversely quantized by the quantization step decoded.

In step 3, only when DPCM has been performed on the DC coefficients, inverse DPCM is performed on the decoded DC coefficients.

In step 4 the decoded motion vector is multiplied by ⅛ in both the horizontal and vertical directions, and motion compensation is performed by employing video signals corresponding to the DC component being reproduced and the previously reproduced DC component.

In step 5 the video signals corresponding to the motion compensated DC components are stored temporarily, and the video signals are output in display order.

By employing the aforementioned algorithm, the video signal stream compressed by the MPEG standard can be readily reproduced in a size of ⅛ in both the horizontal and vertical directions.

Note that since the aforementioned algorithm is an easy process, it is realizable by software and can also be processed in parallel.

Also, a predetermined vector transformation may be employed to obtain the motion vector multiplied by ⅛.

(Sixteenth Embodiment)

Figure 12:
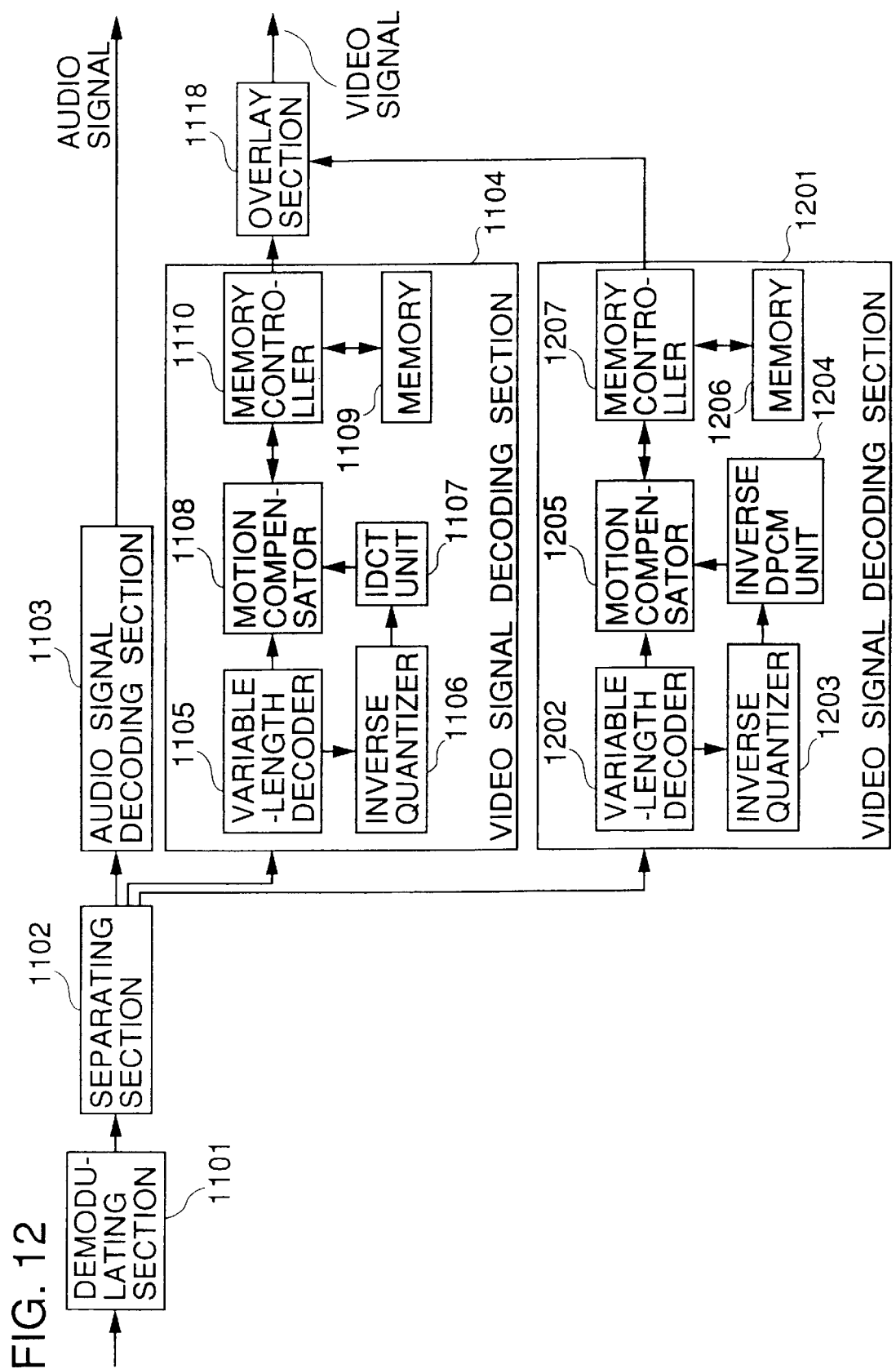
FIG. 12 is a block diagram of a first digital broadcast decoding apparatus (system) according to a 16th embodiment of the present invention.

In FIG. 12 the same reference numerals will be applied to the same parts as FIG. 11 and therefore a description thereof is omitted.

In FIG. 12, 1201 is a video signal decoding section, 1202 a variable-length decoder, 1203 an inverse quantizer, 1204 an inverse differential pulse code modulation (DPCM) unit, 1205 a motion compensator, 1206 memory, and 1207 a memory controller.

The operation in the aforementioned constitution will hereinafter be described.

The demodulating section 1101 performs a predetermined demodulation on a received digital broadcast, thereby generating an MPEG stream.

The separating section 1102 separates the video and audio signal compressed streams on a predetermined channel from the generated MPEG stream.

The audio signal decoding section 1103 decodes the audio signal compressed stream and outputs an audio signal.

The video signal decoding section 1104 outputs a decoded video signal A.

In the video signal decoding section 1201, (1) the variable-length decoder 1202 variable-length decodes the video signal compressed stream and outputs the motion vector of a macroblock unit, a quantization step, and M×N DCT coefficients (M coefficients in a horizontal direction where M is a natural number from 1 to 8 and N coefficients in a vertical direction where N is a natural number from 1 to 8), (2) the inverse quantizer 1203 inversely quantizes by the decoded quantization step only the M×N DCT coefficients quantized at the time of encoding, (3) the inverse DPCM unit 1204 performs inverse DPCM on the M×N DCT coefficients on which DPCM was performed at the time of encoding and then outputs an M×N signal, (4) the motion compensator 1205 reproduces a video signal from a signal reproduced by employing a motion vector multiplied by M/8 in the horizontal direction and by N/8 in the vertical direction and also from a signal stored in the memory 1206 in a macroblock unit, and (5) the memory controller 1207 controls the storage of the reproduced video signal to the memory 1206, the output of the video signal stored in the memory 1206 to the motion compensator 1205, and the output of the reproduced video signal, thereby outputting a decoded video signal B.

In the overlay section 1118, the video signal B (which is M/8 of the video signal A in the horizontal direction and N/8 of the video signal A in the vertical direction) reproduced at the video signal decoder 1201 is overlaid at a predetermined position on the video signal A reproduced at the video signal decoding section 1201, and the overlaid signal is output.

The video signal decoding section 1201 in this embodiment is realizable by a signal process very easy as compared with the video signal decoding section 1104 and with a less memory quantity, so it is also realizable by software. Also, a predetermined vector transformation may be employed to obtain the motion vector multiplied by M/8 in the horizontal direction and by N/8 in the vertical direction.

With this, the digital broadcast decoding system in this embodiment can readily display a broadcasting program on a different channel onto a small screen within a main screen during and reception of a digital broadcasts, by having the structurally simple video signal decoding section 1201 in a conventional digital broadcast decoding system.

Next, the operation of the above-mentioned video signal decoding section 1201 will be described further in reference to FIG. 16.

Figure 16:
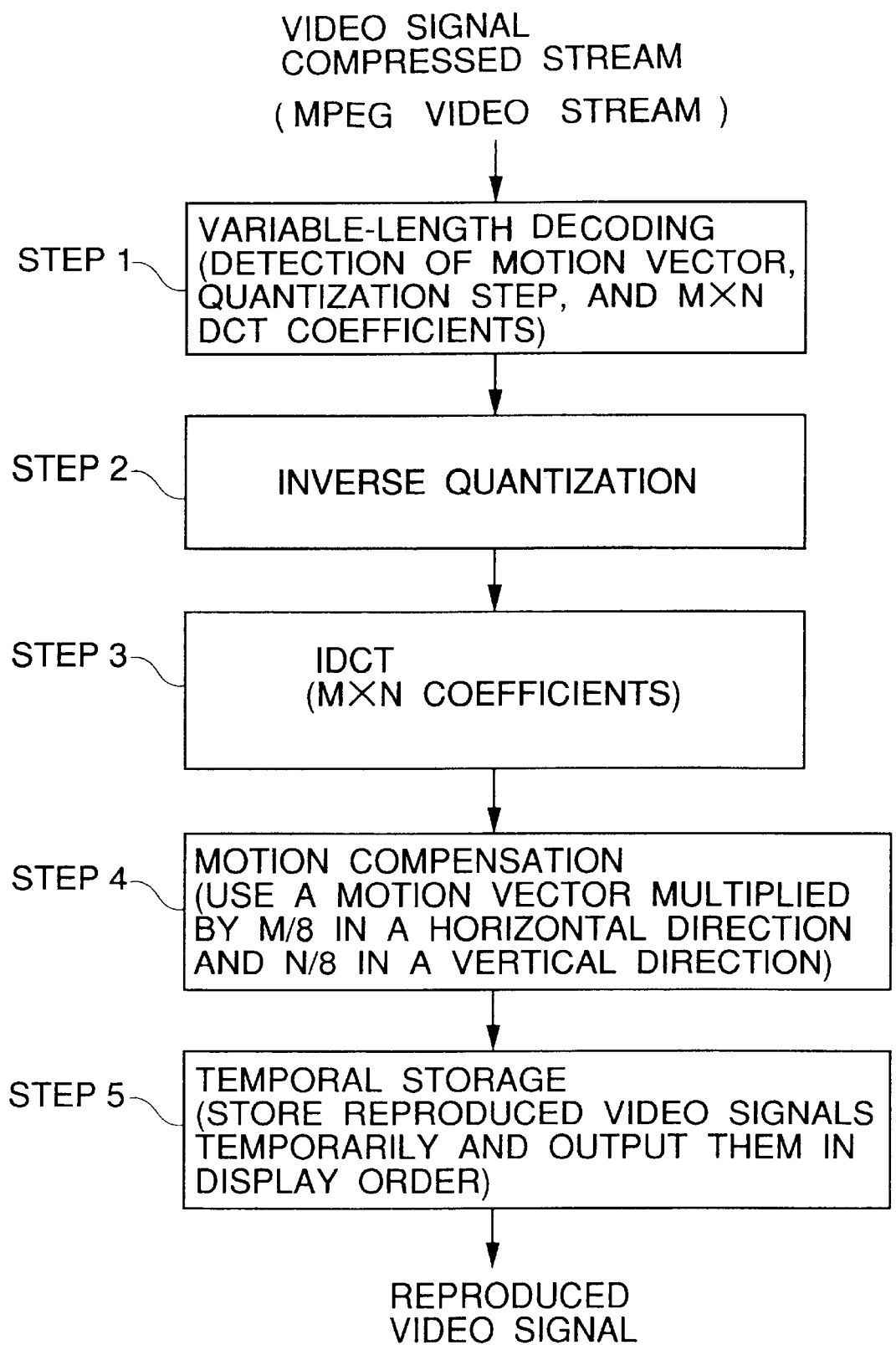
FIG. 16 is a flowchart of a video signal decoding system according to the 16th embodiment of the present invention.

FIG. 16 shows a flowchart used to explain algorithm.

In the figure, in step 1, variable-length decoding is performed on the video signal stream compressed by the MPEG standard, whereby only the motion vector, quantization step, and M×N DCT coefficients (M coefficients in a horizontal direction where M is a natural number from 1 to 8) are extracted.

In step 2 the DCT coefficients are inversely quantized by the quantization step decoded.

In step 3, inverse DCT is performed on the M×N DCT coefficients.

In step 4 the decoded motion vector is multiplied by N/8 in the horizontal direction and by M/8 in the vertical direction, and motion compensation is performed by employing the signal being reproduced and the previously reproduced signal.

In step 5 the motion-compensated video signals are stored temporarily and output in display order.

By employing the aforementioned algorithm, the video signal stream compressed by the MPEG standard can be readily reproduced in a size of M/8 in the horizontal direction and N/8 in the vertical direction.

Note that since the aforementioned algorithm is an easy process, it is realizable by software and can also be processed in parallel.

Also, a predetermined vector transformation may be employed to obtain the motion vector multiplied by M/8 in the horizontal direction and N/8 in the vertical direction.

(Seventeenth Embodiment)

Figure 13:
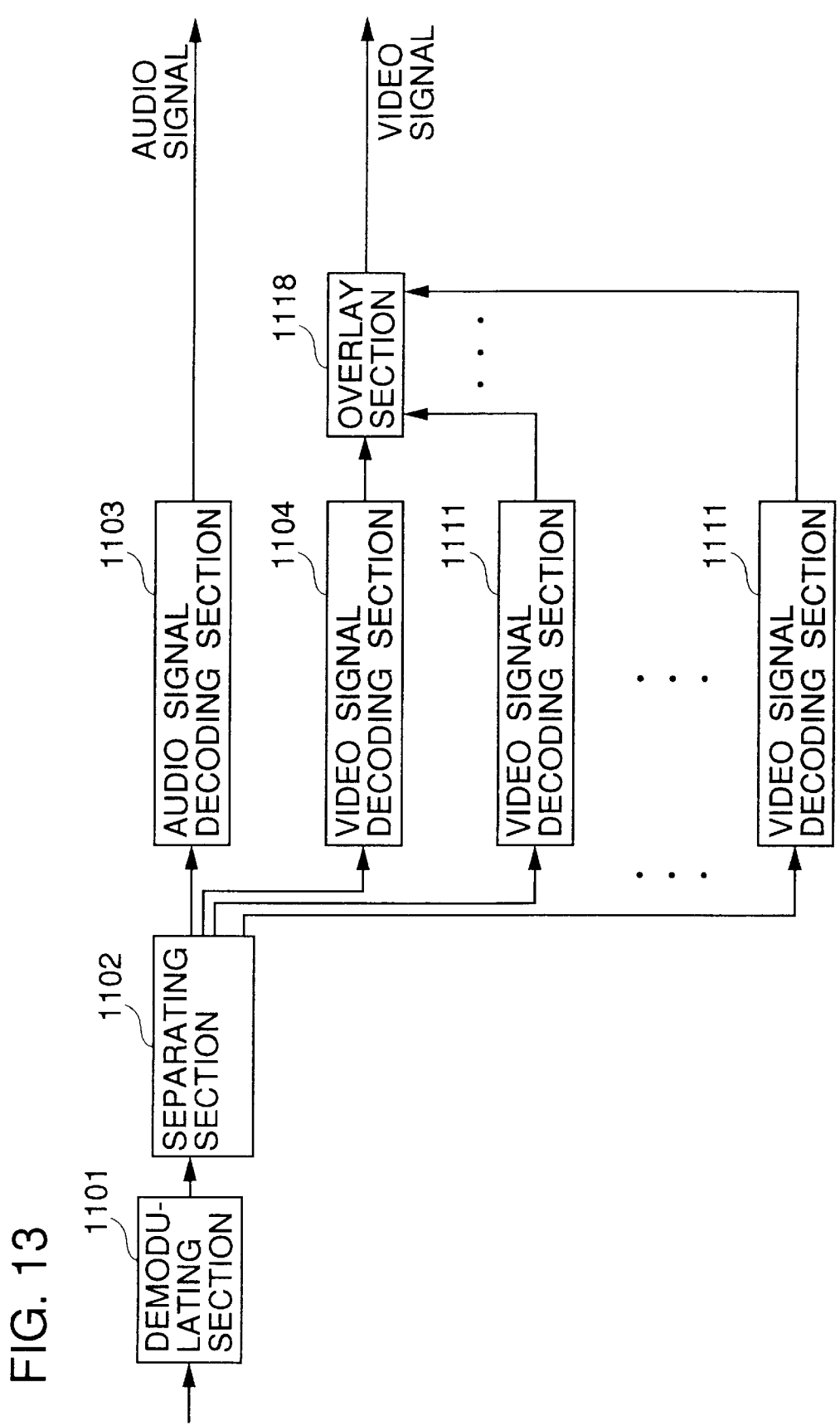
FIG. 13 is a block diagram of a second digital broadcast decoding apparatus (system) according to a 17th embodiment of the present invention.

In FIG. 13 the same reference numerals will be applied to the same parts as FIG. 11 and therefore a description thereof is omitted.

The essential difference with the embodiment shown in FIG. 11 is that K video signal decoding sections 1111 are provided as shown in FIG. 13.

Next, the operation of this embodiment will be described.

A demodulating section 1101 performs a predetermined demodulation on a received digital broadcast, thereby generating an MPEG stream.

A separating section 1102 separates the video and audio signal compressed streams on a predetermined channel from the generated MPEG stream.

An audio signal decoding section 1103 decodes the audio signal compressed stream and outputs an audio signal.

A video signal decoding section 1104 decodes the video signal compressed stream and outputs a decoded video signal A.

The K video signal decoding sections 1111 (where K is a natural number equal to or greater than 1) decode the video signal compressed stream and output a decoded video signal B.

In an overlay section 1118, the K video signals B (which is ⅛ of the video signal A in both horizontal and vertical directions) reproduced at the video signal decoding section 1111 are overlaid at a predetermined position on the video signal A reproduced at the video signal decoding section 1104, and the overlaid signals are output.

The video signal decoding section 1111 in this embodiment is realizable by a signal process very easy as compared with the video signal decoding section 1104 and with a less memory quantity, so it is also realizable by software.

With this, the digital broadcast decoding system in this embodiment can readily display K kinds of broadcasting programs on different channels onto a small screen within a main screen during reception of digital broadcasts, by having the K video signal decoding sections 1111 in a conventional digital broadcast decoding system.

(Eighteenth Embodiment)

Figure 14:
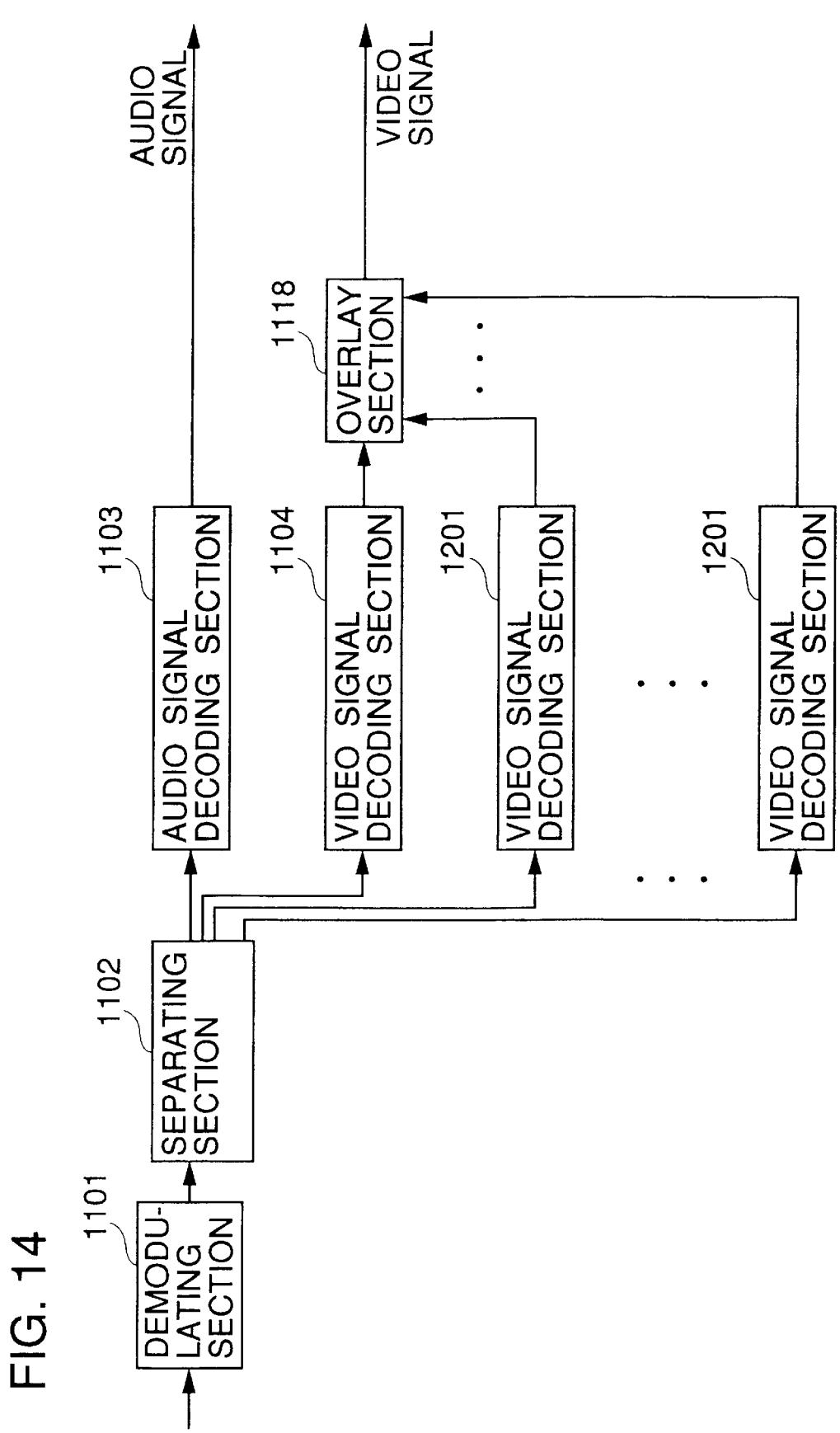
FIG. 14 is a block diagram of a second digital broadcast decoding apparatus (system) according to a 18th embodiment of the present invention.

In FIG. 14 the same reference numerals will be applied to the same parts as FIG. 12 and therefore a description thereof is omitted.

The essential difference with the embodiment shown in FIG. 12 is that K video signal decoding sections 1201 are provided as shown in FIG. 14.

Next, the operation of this embodiment will be described.

A demodulating section 1101 performs a predetermined demodulation on a received digital broadcast, thereby generating an MPEG stream.

A separating section 1102 separates the video and audio signal compressed streams on a predetermined channel from the generated MPEG stream.

An audio signal decoding sections 1103 decodes the audio signal compressed stream and outputs an audio signal.

A video signal decoding section 1104 decodes the video signal compressed stream and outputs a decoded video signal A.

The K video signal decoding sections 1201 (where K is a natural number equal to or greater than 1) decode the video signal compressed stream and output a decoded video signal B.

In an overlay section 1118, the K video signals B (which is M/8 of the video signal A in the horizontal direction and N/8 of the video signal A in the vertical direction) reproduced at the video signal decoding section 1111 are overlaid at a predetermined position on the video signal A reproduced at the video signal decoding section 1104, and the overlaid signals are output.

The video signal decoding section 1201 in this embodiment is realizable by a signal process very easy as compared with the video signal decoding section 1104 and with a less memory quantity, so it is also realizable by software.

With this, the digital broadcast decoding system in this embodiment can readily display K kinds of broadcasting programs on different channels onto a small screen within a main screen during reception of digital broadcasts, by having the K video signal decoding sections 1201 in a conventional digital broadcast decoding system.

(Nineteenth Embodiment)

Figure 17:
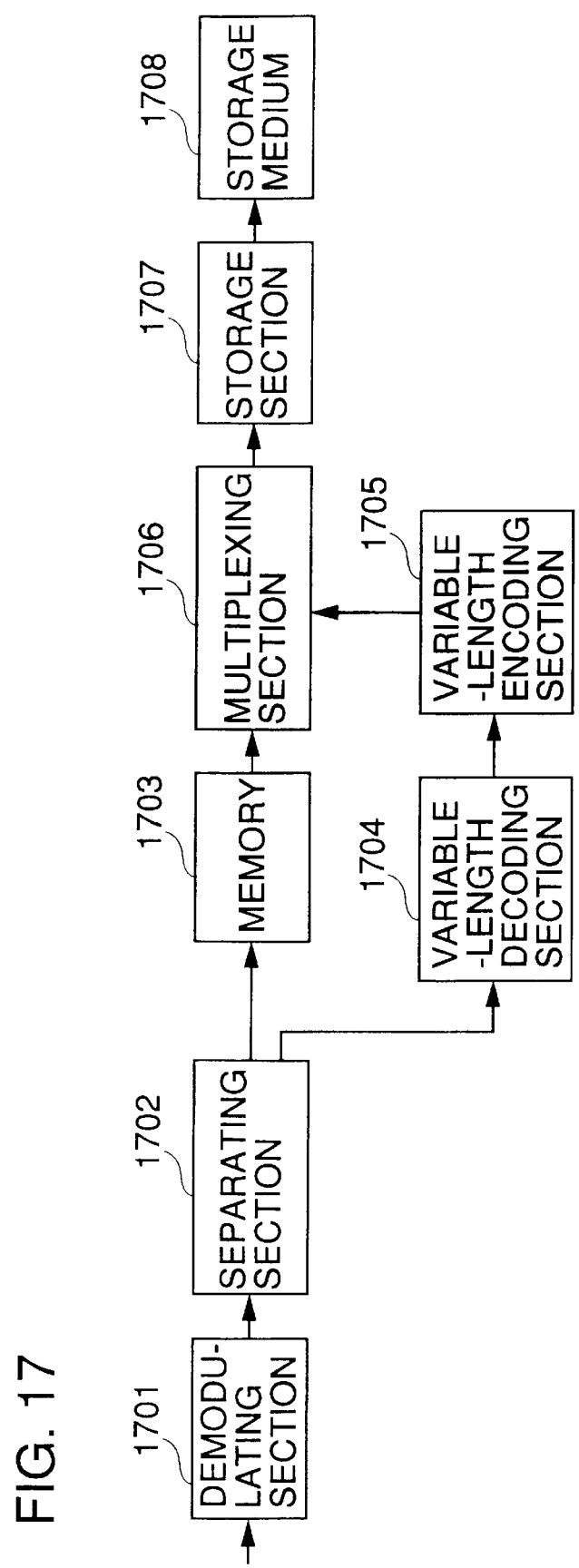
FIG. 17 is a block diagram of a digital broadcasting signal storage according to a 19th and a twentieth embodiments of the present invention.

For a digital broadcasting signal storage according to a nineteenth embodiment of the present invention, a description will be made of the constitution and operation in reference to FIG. 17. FIG. 17 illustrates a block diagram of the digital broadcasting signal storage of this embodiment.

In the figure, 1701 is a demodulating section, 1702 a separating section, 1703 memory, 1704 a variable-length decoding section, 1705 a variable-length encoding section, 1706 a multiplexing section, 1707 a storage section, and 1708 a storage medium.

Figure 18:
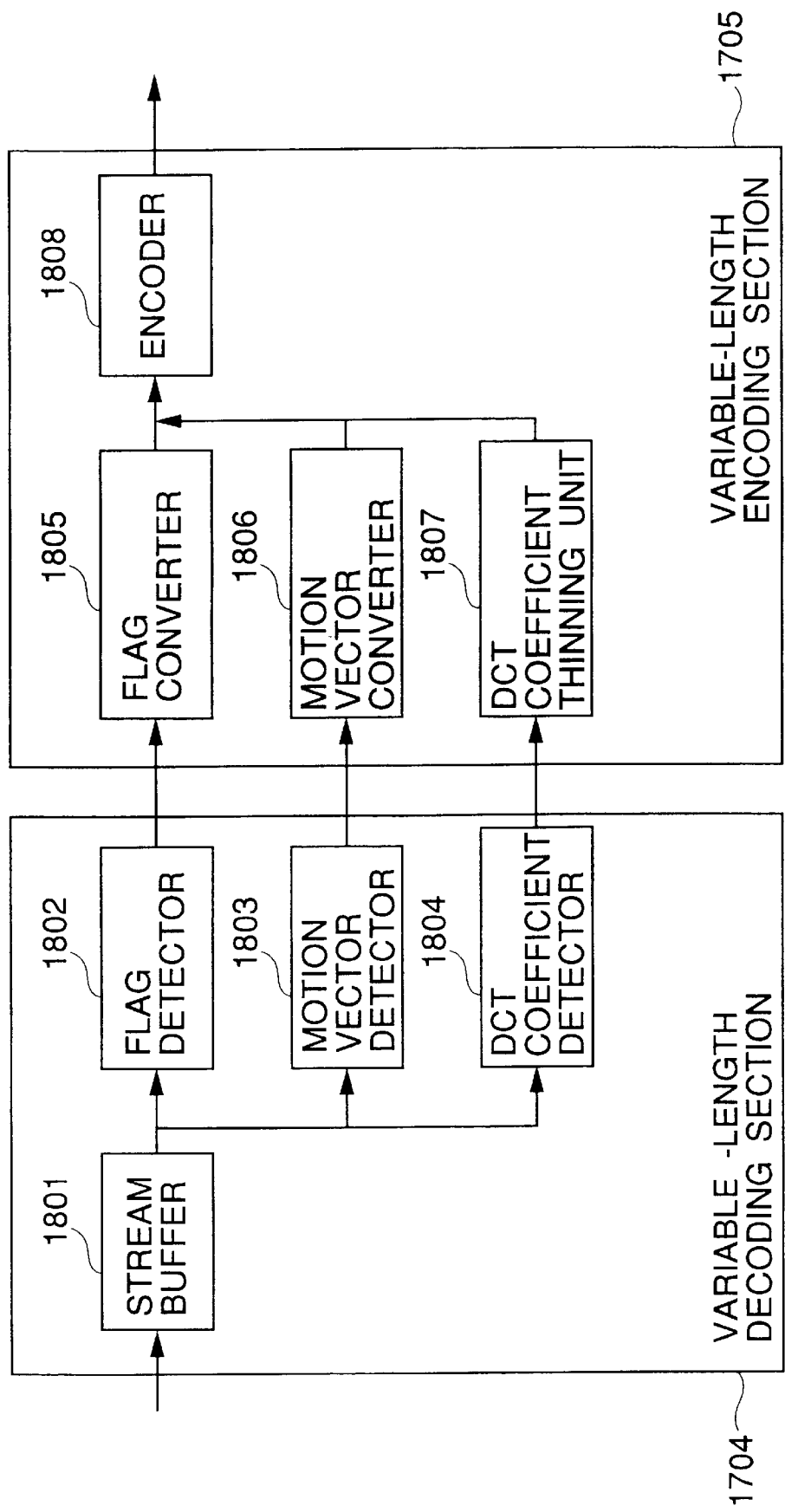
FIG. 18 is a block diagram of the variable-length decoding section and variable-length encoding section of the 19th embodiment of the present invention.

In FIG. 18, 1801 is a stream buffer, 1802 a flag detector, 1803 a motion vector detector, 1804 a DCT coefficient detector, 1805 a flag converter, 1806 a motion vector converter, 1807 a DCT coefficient thinning unit, and 1808 an encoder.

The demodulating section 1701 performs a predetermined demodulation on a received digital broadcast, thereby generating an MPEG stream.

The separating section 1702 separates the video and audio signal streams on a predetermined channel from the generated MPEG stream.

The memory 1703 stores the audio signal compressed stream temporarily.

The variable-length decoding section 1704 performs variable-length decoding on the video signal compressed stream and selects and outputs only various flags, motion vectors, and a predetermined number of DCT coefficients (M coefficients in a horizontal direction where M is a natural number from 1 to 8 and N coefficients in a vertical direction where N is a natural number from 1 to 8).

The variable-length encoding section 1705 performs a predetermined flag transformation (e.g., a change in the number of horizontal pixels and vertical pixels) on the selected various flags and also performs a motion vector transformation on the selected motion vectors.

Then, the encoding section 1705 performs variable-length encoding on the results of the transformations and performs variable-length encoding on the selected predetermined number of DCT coefficients.

Here, the variable-length decoding section 1704 and the variable-length encoding section 1705 will be described in reference to FIG. 18.

The variable-length decoding section 1704 stores an input stream in the stream buffer 1801 temporarily.

The flag detector 1802 detects a flag in the stream, then decodes the detected flag, and outputs the decoded flag.

The motion vector detector 1803 detects a motion vector in the stream, then decodes the detected motion vector, and outputs the decoded motion vector.

The DCT coefficient detector 1804 detects DCT coefficients in the stream, then decodes the detected DCT coefficients, and outputs the decoded DCT coefficients.

In the variable-length encoding section 1705, the flag converter 1805 performs a predetermined flag transformation on various flags and outputs the transformed flags.

The motion vector converter 1806 performs a motion vector transformation (e.g., M/8 times in a horizontal direction where M is a natural number from 1 to 8 and N/8 times in a vertical direction where N is a natural number from 1 to 8) and outputs the transformed motion vector.

The DCT coefficient thinning unit 1807 outputs a predetermined number of DCT coefficients (e.g., horizontal M pixels and vertical N pixels in a low band component where M and N are a natural number from 1 to 8).

The encoder 1808 variable-length encodes the transformed flag, transformed motion vector, and a predetermined number of DCT coefficients by a predetermined encoding code and then outputs them.

Also, the multiplexing section 1706 multiplexes the audio signal compressed stream in the memory 1703 and the video signal compressed stream which is the output of the variable-length encoding section 1705.

The storage section 1707 stores the multiplexed data in the storage medium 1708.

Note that the flag converter 1805, motion vector converter 1806, and DCT coefficient thinning unit 1807 in FIG. 18 are not included in the variable-length encoding section 1705 but may be included in the variable-length decoding section 1704.

(Twentieth Embodiment)

Figure 19:
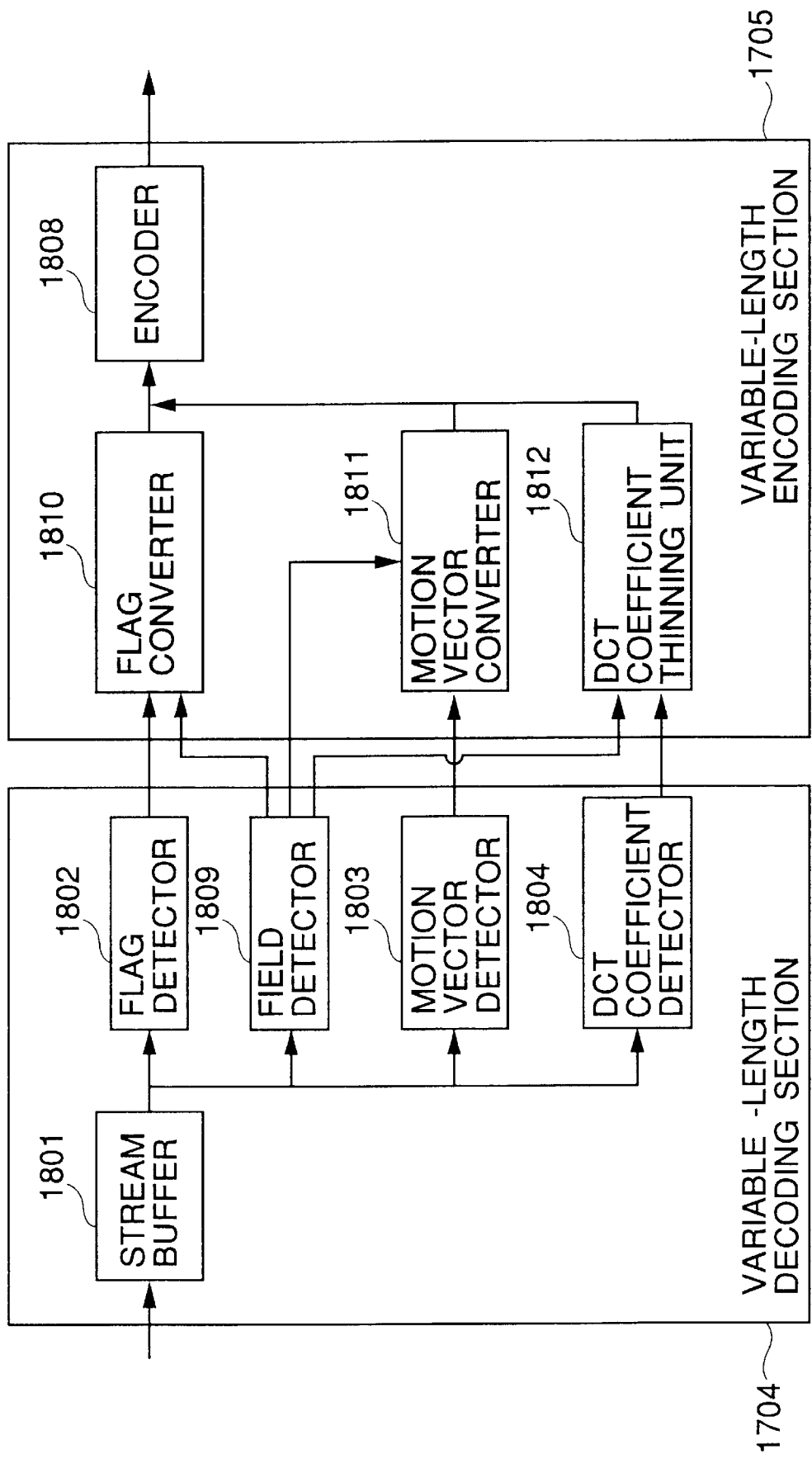
FIG. 19 is a block diagram of the variable-length decoding section and a variable-length encoding section according to the twentieth embodiment of the present invention.

In FIG. 19 the same reference numerals will be applied to the same parts as FIG. 18 and therefore a description thereof is omitted.

In FIG. 19, 1809 is a field detector, 1810 a flag converter, 1811 a motion vector converter, and 1812 a DCT coefficient thinning unit.

A variable-length decoding section 1704 in this embodiment stores an input stream in a stream buffer 1801 temporarily.

A flag detector 1802 detects a flag in the stream, then decodes the detected flag, and outputs the decoded flag.

The field detector 1809 detects whether or not the macroblock has a field vector and whether or not a field DCT has been performed on the macroblock, and outputs the result of detection.

A motion vector detector 1803 detects a motion vector in the stream, then decodes the detected motion vector, and outputs the decoded motion vector.

A DCT coefficient detector 1804 detects DCT coefficients in the stream, then decodes the detected DCT coefficients, and outputs the decoded DCT coefficients.

In a variable-length encoding section 1705 in this embodiment, the flag converter 1810 performs a predetermined flag transformation on various flags in view of the detection result obtained by the field detector 1809 and then outputs the transformed flags.

The motion vector converter 1811 performs a motion vector transformation (e.g., M/8 times in a horizontal direction where M is a natural number from 1 to 8 and N/8 times in a vertical direction where N is a natural number from 1 to 8) when a motion vector has been determined in a frame unit. Also, when a motion vector has been determined in a field unit, the motion vector converter 1811 converts the motion vector to a frame unit by a predetermined approximation method, then performs a motion vector transformation (e.g., M/8 times in a horizontal direction where M is a natural number from 1 to 8 and K/8 times in a vertical direction where K is a natural number from 1 to 8), and outputs the transformed motion vector.

The DCT coefficient thinning unit 1812 selects only a predetermined number of DCT coefficients (e.g., M coefficients in a horizontal direction and N coefficients in a vertical direction where M and N are a natural number from 1 to 8) when DCT coefficients have been determined in a frame unit. Also, when DCT coefficients have been determined in a field unit, the DCT coefficient thinning unit 1807 deletes one group of DCT coefficients and outputs a predetermined number of DCT coefficients (M coefficients in a horizontal direction and K coefficients in a vertical direction where M and K are a natural number from 1 to 8).

The encoder 1808 variable-length encodes the transformed flag, transformed motion vector, and a predetermined number of DCT coefficients by a predetermined encoding code and then outputs them.

Note that the flag converter 1810, motion vector converter 1811, and DCT coefficient thinning unit 1812 in FIG. 19 are not included in the variable-length encoding section 1705 but may be included in the variable-length decoding section 1704.

Figure 20:
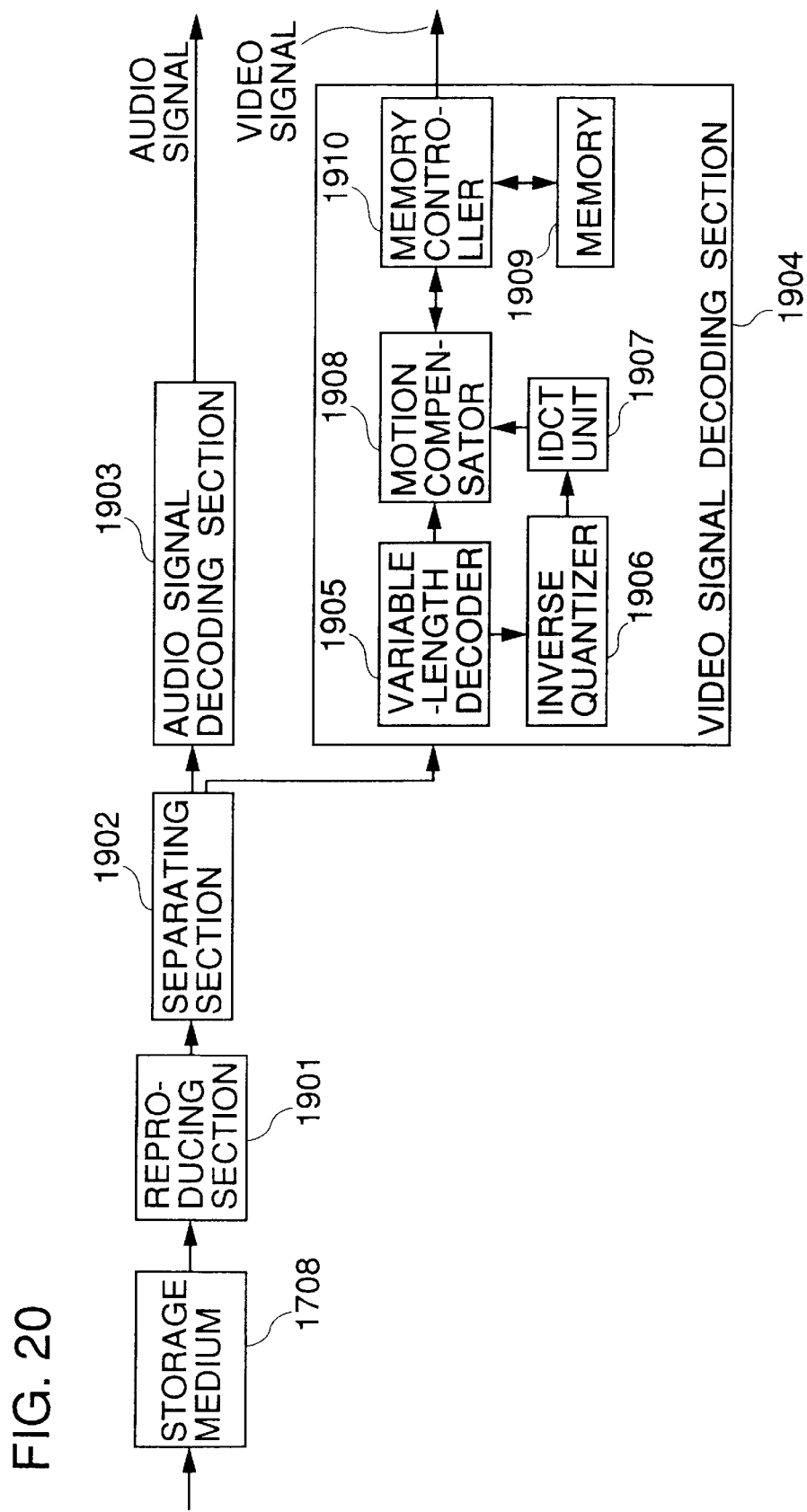
FIG. 20 is a block diagram of a video signal reproducing apparatus (system) according to a twenty-first embodiment of the present invention.

(Twenty-First Embodiment) In FIG. 20 the same reference numerals will be applied to the same parts as FIG. 17 and therefore a description thereof is omitted.

In FIG. 20, 1901 is a reproducing section, 1902 a separating section, 1903 an audio signal decoding section, 1904 a video signal decoding section, 1905 a variable-length decoder, 1906 an inverse quantizer, 1907 an IDCT unit, 1908 a motion compensator, 1909 memory, and 1910 a memory controller.

The operation in the aforementioned constitution will hereinafter be described.

The reproducing section 1901 reproduces recorded multiplexed data from a storage medium 1707.

The separating section 1902 separates the reproduced multiplexed data into video and audio signal compressed streams and then outputs the streams.

The audio signal decoding section 1903 decodes the audio signal compressed stream and outputs an audio signal.

In the video signal decoding section 1904, (1) the variable-length decoder 1905 variable-length decodes the aforementioned video signal compressed stream, and the inverse quantizer 1906 inversely quantizes the decoded video signal stream, (2) the IDCT unit 1907 performs an inverse M×N or M×K DCT (where M, N, and K are a natural number from 1 to 8), (3) the motion compensator 1908 reproduces a video signal from a signal reproduced by employing a motion vector and also from a signal stored in the memory 1909, and (4) the memory controller 1910 controls the storage of the reproduced video signal to the memory 1909, the output of the video signal stored in the memory 1909 to the motion compensator 1908, and the output of the reproduced video signal.

In accordance with this embodiment, if DCT coefficients are thinned out, an amount of data to be stored can be reduced and the speed of requisite data can be slowed down.

(Twenty-Second Embodiment)

Figure 21:
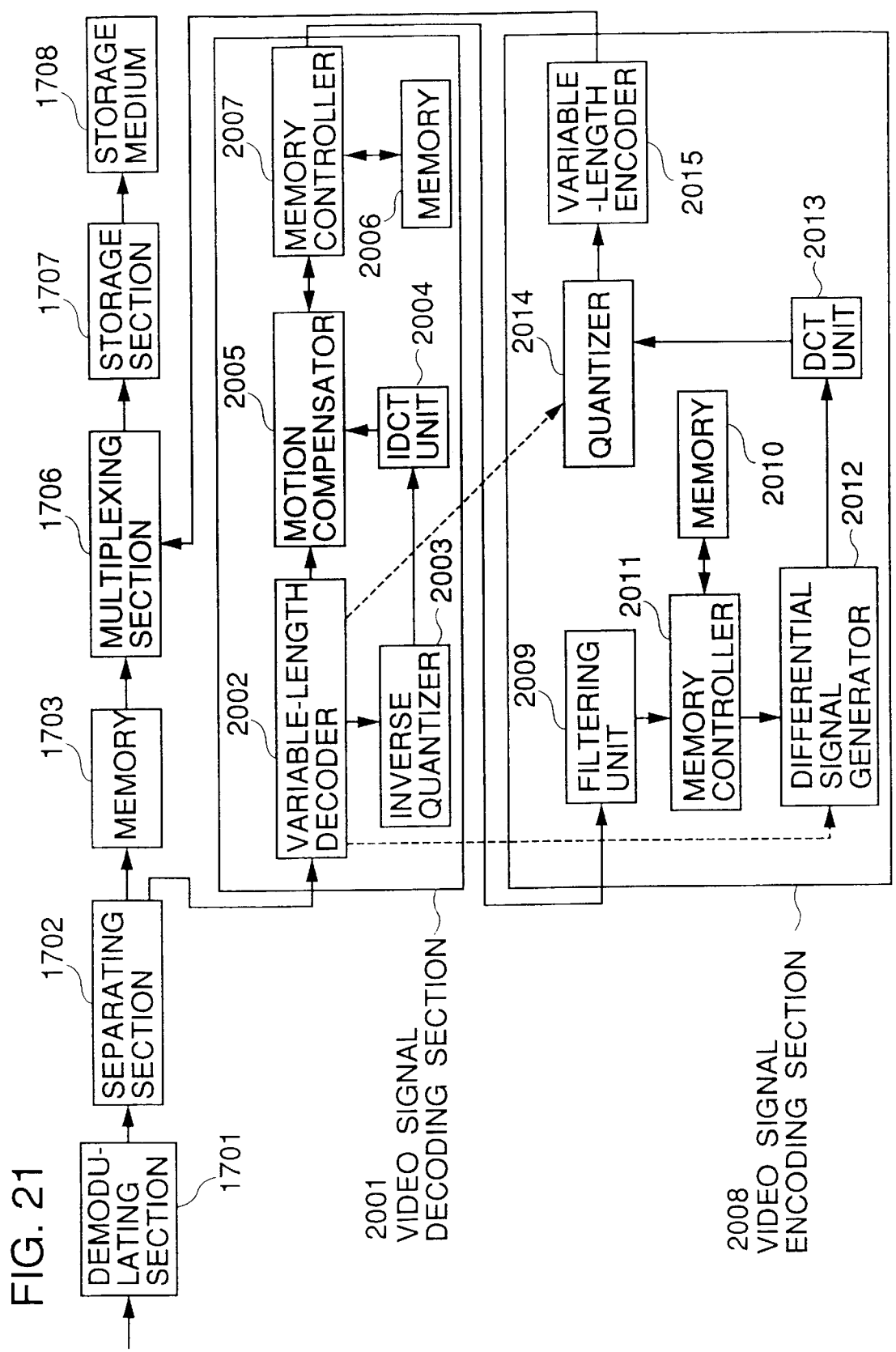
FIG. 21 is a block diagram of a digital broadcasting signal storage according to a twenty-second embodiment of the present invention.
Figure 22:
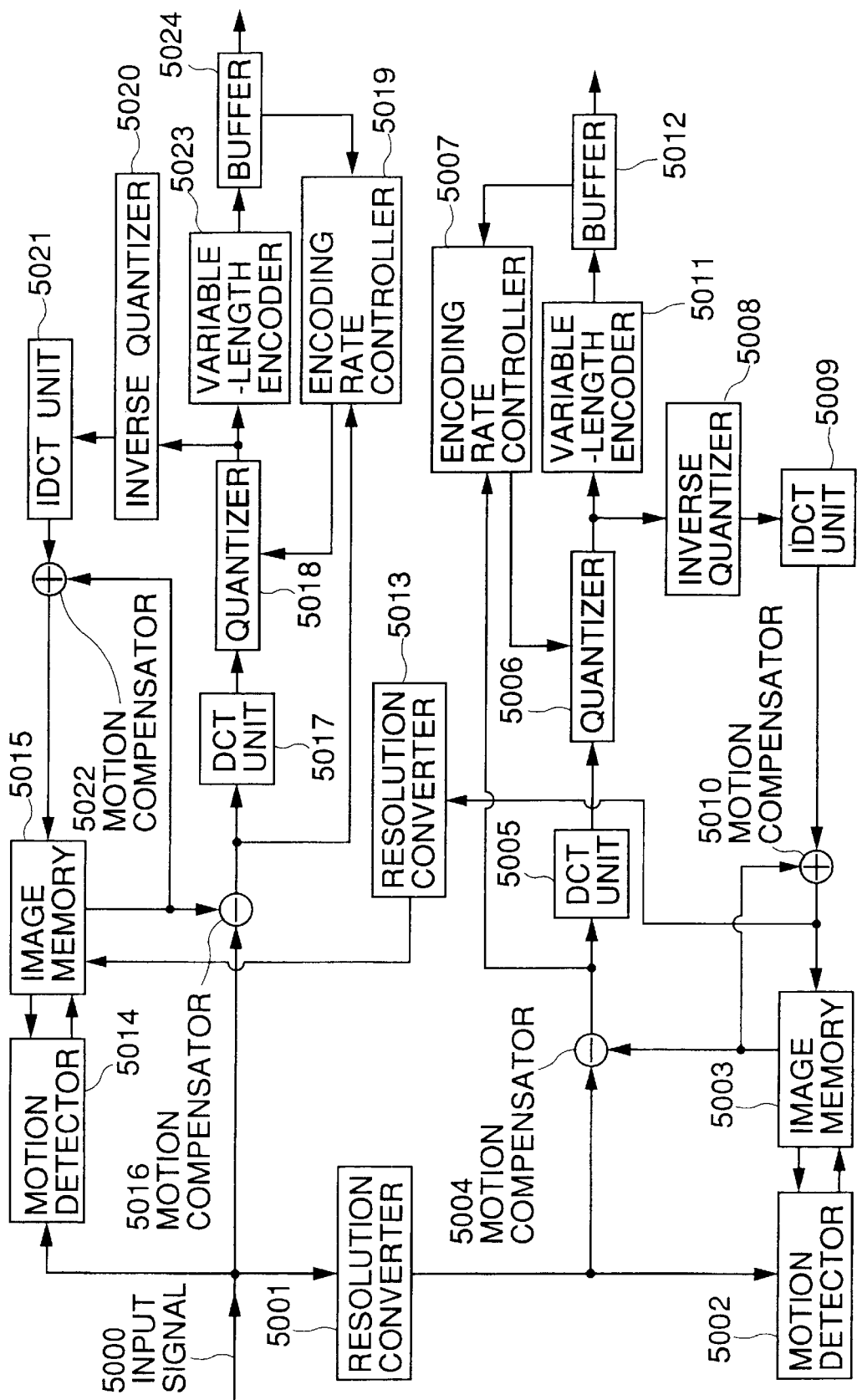
FIG. 22 is a block diagram of a conventional video signal layering-encoding apparatus (system)
Figure 23:
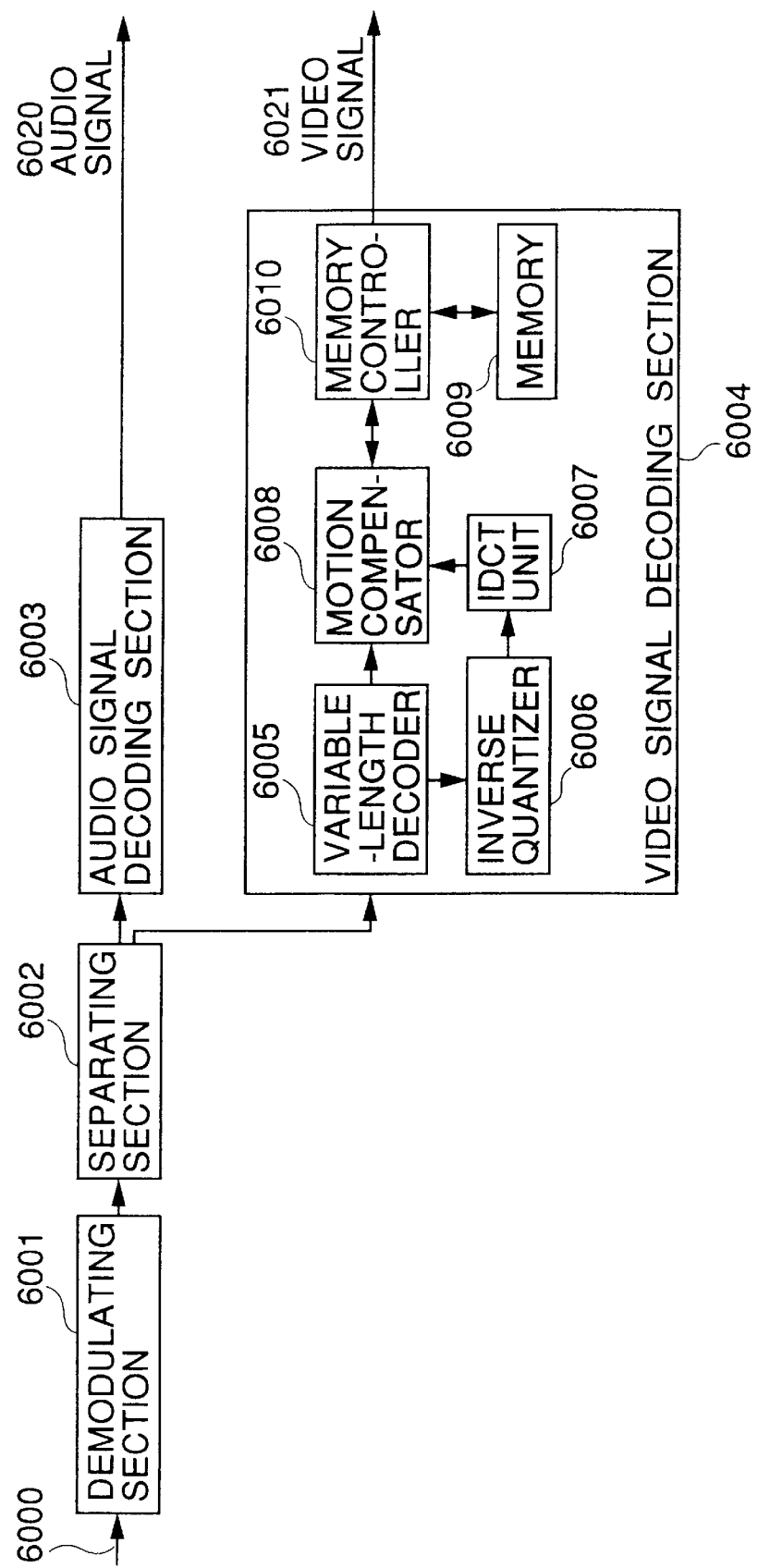
FIG. 23 is a block diagram of a conventional digital broadcast decoding apparatus (system)
Figure 24:
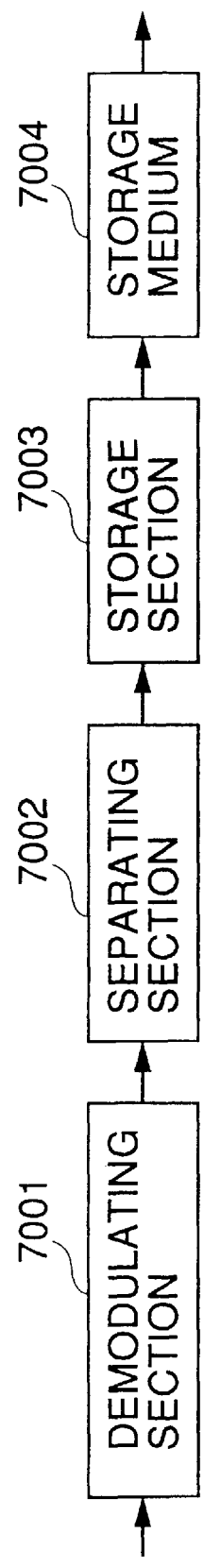
FIG. 24 is a block diagram of a conventional digital broadcasting signal storage.

In FIG. 21 the same reference numerals will be applied to the same parts as FIG. 17 and therefore a description thereof is omitted.

In FIG. 21, 2001 is a video signal decoding section, 2002 a variable-length decoder, 2003 an inverse quantizer, 2004 an IDCT unit, 2005 a motion compensator, 2006 memory, 2007 a memory controller, 2008 a video signal encoding section, 2009 a filtering unit, 2010 memory, 2011 a memory controller, 2012 a differential signal generator, 2013 a DCT unit, 2014 a quantizer, and 2015 a variable-length encoder.

The operation in the aforementioned constitution will hereinafter be described.

In the video signal decoding section 2001, (1) the variable-length decoder 2002 variable-length decodes a video signal compressed stream, and the inverse quantizer 2003 inversely quantizes the decoded video signal stream, (2) the IDCT unit 2004 performs an inverse DCT, (3) the motion compensator 2005 reproduces a video signal from a signal reproduced by employing a motion vector and also from a signal stored in the memory 2006, and (4) the memory controller 2007 controls the storage of the reproduced video signal to the memory 2006, the output of the video signal stored in the memory 2006 to the motion compensator 2005, and the output of the reproduced video signal.

On the other hand, in the video signal encoding section 2008, the filtering unit 2009 performs a predetermined filtering operation on a video signal which is the output of the video signal decoding section 2001, thereby changing the resolution of the video signal.

The memory controller 2011 controls the storage of the filtered video signal to the memory 2010, the output of the video signal stored in the memory 2010 to the differential signal generator 2012, and the output of the filtered video signal.

The differential signal generator 2012 changes the motion vector decoded at the video signal decoding section 2001 so that the motion vector is suitable to the reproduced video signal after the aforementioned filtering operation, thereby generating a differential signal.

The DCT unit 2013 performs DCT on the differential signal. The quantizer 2014 changes the quantization step decoded at the video signal decoding section 2001 so that the quantization step is suitable to the reproduced video signal after the aforementioned filtering operation and the data ra after compression, and then performs quantization by utilizing the changed quantization step.

The variable-length encoder 2015 performs variable-length encoding on the quantized data and various attached data.

Note that the nineteenth through the twenty-second embodiments are realizable by software.

With this, even in the case where video signals in various formats (resolution, frame frequency, etc.) were input, video signals can be readily stored in or reproduced from a storage medium as a single format.

While the present invention has been described with reference to the preferred embodiments thereof, the invention is not to be limited to the details given herein, but may be modified within the scope of the appended claims.

What is claimed is:

1. A method of layering and encoding an input video signal on the basis of spatial resolution, comprising:

a first resolution transformation step of generating a second video signal with low resolution from a first video signal with high resolution which is said input video signal;

a first encoding step of encoding said second video signal;

a decoding step of decoding the encoded second video signal;

a second resolution transformation step of generating a third video signal with the same high resolution as said first video signal, based on the decoded video signal obtained by decoding said second video signal;

a second encoding step of encoding a video signal with the same high resolution as said first video signal, obtained based on said first video signal and said third video signal;

a high frequency component information output step of outputting information on a high frequency component which is included in said first video signal or said second video signal; and an encoding quantity control step of controlling an encoding rate at which said second video signal is encoded by said first encoding step and an encoding rate at which said first video signal is encoded by said second encoding step, based on the output high frequency component information.

* * * * *